(12) United States Patent
Pronsati, Jr. et al.

(10) Patent No.: US 6,678,716 B1
(45) Date of Patent: Jan. 13, 2004

(54) SYSTEM AND METHOD FOR MANAGING PROCESSES

(75) Inventors: Paul Louis Pronsati, Jr., Norristown, PA (US); Vito John Solimene, Denver, CO (US); Merrill Eugene Peterson, II, Denver, CO (US); Garry Wayne Stumpf, Parker, CO (US)

(73) Assignee: J. D. Edwards World Source Company, Denver, CO (US)

( * ) Notice: Subject to any disclaimer, the term of this patent is extended or adjusted under 35 U.S.C. 154(b) by 723 days.

(21) Appl. No.: 09/596,765

(22) Filed: Jun. 19, 2000

(51) Int. Cl.[7] ............................................. G06F 15/16
(52) U.S. Cl. .................. 709/201; 709/100; 709/106; 709/205; 710/6
(58) Field of Search ......................... 709/310, 201–202, 709/205–206, 208, 100–103, 106–107; 710/5–7, 58; 714/38

(56) References Cited

U.S. PATENT DOCUMENTS

| | | | | |
|---|---|---|---|---|
| 5,295,264 A | * | 3/1994 | Werres et al. ................ 709/103 |
| 5,295,265 A | * | 3/1994 | Ducateau et al. ............ 709/100 |
| 5,506,963 A | * | 4/1996 | Ducateau et al. ............ 709/107 |
| 5,850,521 A | * | 12/1998 | Morganit et al. ............ 709/208 |
| 6,119,246 A | * | 9/2000 | McLaughlin et al. ......... 714/27 |
| 6,160,586 A | * | 12/2000 | Justiss et al. ................ 348/452 |

* cited by examiner

Primary Examiner—Bharat Barot
(74) Attorney, Agent, or Firm—Sheridan Ross P.C.

(57) ABSTRACT

The process management system includes task information indicative of tasks that define process steps for a group of processes. The task information defines the steps as software events and as non-software events. The system further includes task relationship information indicative of a relationship between the tasks to define the processes, and application information defining the software events. A user interface displays the tasks and enables the selection of the tasks. The processes are completed by selecting the tasks associated with a particular process and executing the software events and the non-software events corresponding to the selected tasks.

30 Claims, 22 Drawing Sheets

*Fig. 7*

| TASK ID | TASK DESCRIPTION | TASK TYPE | APPLICATION | T/L ACTIVE FLAG | ACTIVATOR | ROUGH CUT RULE ID | LINK | SYSTEM CODE |
|---|---|---|---|---|---|---|---|---|
| T1 | PROCUREMENT PROCESS | NON S/W |  | Y | N | R1 |  | 06 |
| T2 | PAYROLL PROCESS | NON S/W |  | N | N | R2 |  | 10 |
| ooo | ooo | ooo | ooo | ooo | ooo | ooo | ooo | ooo |
| T5 | STOCK PROCUREMENT | NON S/W |  | Y | Y | R6 | TV1:TN | 06 |
| T6 | CREATE REQUISITION | S/W | A1 | Y | N |  |  | 06 |
| T7 | PROCESS REQUISITION | S/W | A2 | Y | N |  |  | 06 |
| T8 | PROCESS PURCHASE ORDER | S/W | A3 | Y | N |  |  | 06 |
| T9 | ELECTRONIC PROCUREMENT | NON S/W | A4 | Y | Y | R7 | TV1:TN | 06 |
| T10 | CREATE OR CHANGE e-REQUISITION | S/W | A5 | Y | N |  |  | 06 |
| T11 | APPROVE e-REQUISITION | S/W | A6 | Y | N |  |  | 06 |
| T12 | PROCESS e-REQUISITION | S/W |  | Y | N |  |  | 06 |
| T13 | PROCESS PAYMENTS | S/W |  | Y | N |  |  | 06 |
| ooo | ooo | ooo | ooo | ooo | ooo | ooo | ooo | ooo |
| TN | SET UP PROCUREMENT | NON S/W |  | Y | N | R8 |  | 06 |
| ooo | ooo | ooo | ooo | ooo | ooo | ooo | ooo | ooo |

| TASK VIEW | PARENT TASK ID | CHILD TASK ID | VARIANT ID | T/R ACTIVE FLAG | LINK | ROUGH CUT RULE ID |
|---|---|---|---|---|---|---|
| TV1 | T1 | T5 | | Y | TVX:TXX | R3 |
| TV1 | T1 | T9 | | Y | | R4 |
| TV1 | T1 | T15 | | Y | | R5 |
| TV1 | T5 | T6 | | Y | | |
| TV1 | T5 | T7 | | Y | | |
| TV1 | T5 | T8 | | Y | | |
| TV1 | T5 | T6 | V1 | N | | |
| TV1 | T5 | T7 | V1 | N | | |
| TV1 | T5 | T8 | V2 | Y | | |
| TV1 | T9 | T10 | | Y | | |
| TV1 | T9 | T11 | | Y | | |
| TV1 | T15 | T12 | | Y | | |
| TV1 | | TN | | Y | | R10 |
| ... | ... | ... | ... | ... | ... | ... |
| TVX | TX | TXX | | Y | | RR |

Fig. 8

| VARIANT ID | VARIANT NAME | VARIANT DISCRIPTION | VARIANT VERSION |
|---|---|---|---|
| V1 | PLANNED STOCK PROCUREMENT | PROCESS P/O FOR NON-STOCK ITEM | A10 |
| V2 | NON-STOCK REQUISITION | | |
| V3 | STOCK REQUISITION | | |
| ... | ... | ... | ... |
| VV | | | AA |

850 — 852 VARIANT ID, 854 VARIANT NAME, 856 VARIANT DISCRIPTION, 858 VARIANT VERSION

*Fig. 9*

SYSTEM AND METHOD FOR MANAGING PROCESSES

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A "MICROFICHE APPENDIX"

Not applicable.

BACKGROUND OF THE INVENTION

1. Technical Field

The present invention relates in general to a system and method for managing processes. The invention more particularly relates to a system and method for customizing, adapting and creating business and technical processes for an enterprise.

2. Background Art

An enterprise is an organization of business activity groups that work together for the good of the entire enterprise. In general, the business activity groups are distinct from one another. For example, an enterprise may include an accounting department, a human resources department, a manufacturing organization and a distribution organization. Each of these business activity groups have their own functions and may utilize their own business processes, but they may utilize some of the same information.

Enterprise resource planning ("ERP") systems were introduced by ERP vendors to enable the enterprise to integrate the operations of the business activity groups, and to share information between its business activity groups, in order to make the enterprise more efficient. The ERP systems were quite complex and included application software for administering each of the business activity groups. Due to the complexity of the ERP systems, the application software for the various business activity groups was pre-programmed to inter-operate, and to share information, with the application software for the other business activity groups. By pre-programming the application software, the ERP vendor defined the business processes, e.g., a billing procedure, embodied in the application software, and consequently determined the business processes available to the business activity group.

In addition to defining the business processes embodied in the application software, the ERP systems also defined technical processes associated with the ERP system. The technical processes, such as the processes for seating up the ERP system hardware and for installing the application software onto the hardware, were pre-defined by the ERP vendor to ensure interoperability. Thus, the ERP vendor also determined the technical processes that were available to the business activity groups of the enterprise.

An enterprise that desired to implement an ERP system had few choices. The enterprise could purchase an ERP system that incorporated the same business and technical processes used by the enterprise, it could change its business and technical processes to match the business and technical processes embodied in the ERP system, or it could settle for a combination of both.

While the enterprise could select and implement an ERP system that matched the business and technical processes of the enterprise, or could modify its business and technical processes to match those of the ERP system, the ERP system was relatively inflexible once the implementation of the ERP system was completed. Any subsequent changes to the business and technical processes for any of the business activity groups required the re-programming of the pertinent application software by a programmer having expertise with the ERP system and its application software. Consequently, a significant amount of time and expense was required to incorporate the changes to the business and technical processes into the application software, resulting in lengthy downtimes and lost productivity.

Therefore, it would be highly desirable to have a new and improved system and method for managing processes including customizing, adapting and creating business and technical processes for an enterprise. Such a system should not require programming expertise, and should enable making changes to the processes in a relatively quick manner to substantially limit the loss of productivity due to downtime.

SUMMARY OF THE INVENTION

Therefore, the principal object of the present invention is to provide a new and improved system and method for managing the processes of an enterprise, wherein the processes can be customized and adapted, and new processes can be created, quickly and without the need for programming expertise.

Briefly, the above and further objects of the present invention are realized by providing a new and improved process management system that can customize, adapt and create business and technical processes according to a novel method of the present invention.

The process management system includes task information indicative of tasks that define process steps for a group of processes. The task information defines the steps as software events and as non-software events. The system further includes task relationship information indicative of a relationship between the tasks to define the processes, and application information defining the software events. A user interface displays the tasks and enables the selection of the tasks. The processes are completed by selecting the tasks associated with a particular process and executing the software events and the non-software events corresponding to the selected tasks.

BRIEF DESCRIPTION OF THE DRAWINGS

The above mentioned and other objects and features of this invention and the manner of attaining them will become apparent, and the invention itself will be best understood by reference to the following description of the embodiment of the invention in conjunction with the accompanying drawings, wherein:

FIG. 7 is a table describing the task property information of FIG. 4;

FIG. 8 is a table describing the task relationship information of FIG. 6;

FIG. 9 is a table describing variant information maintained by the system of FIG. 1;

BEST MODE FOR CARRYING OUT THE INVENTION

Figure 1:
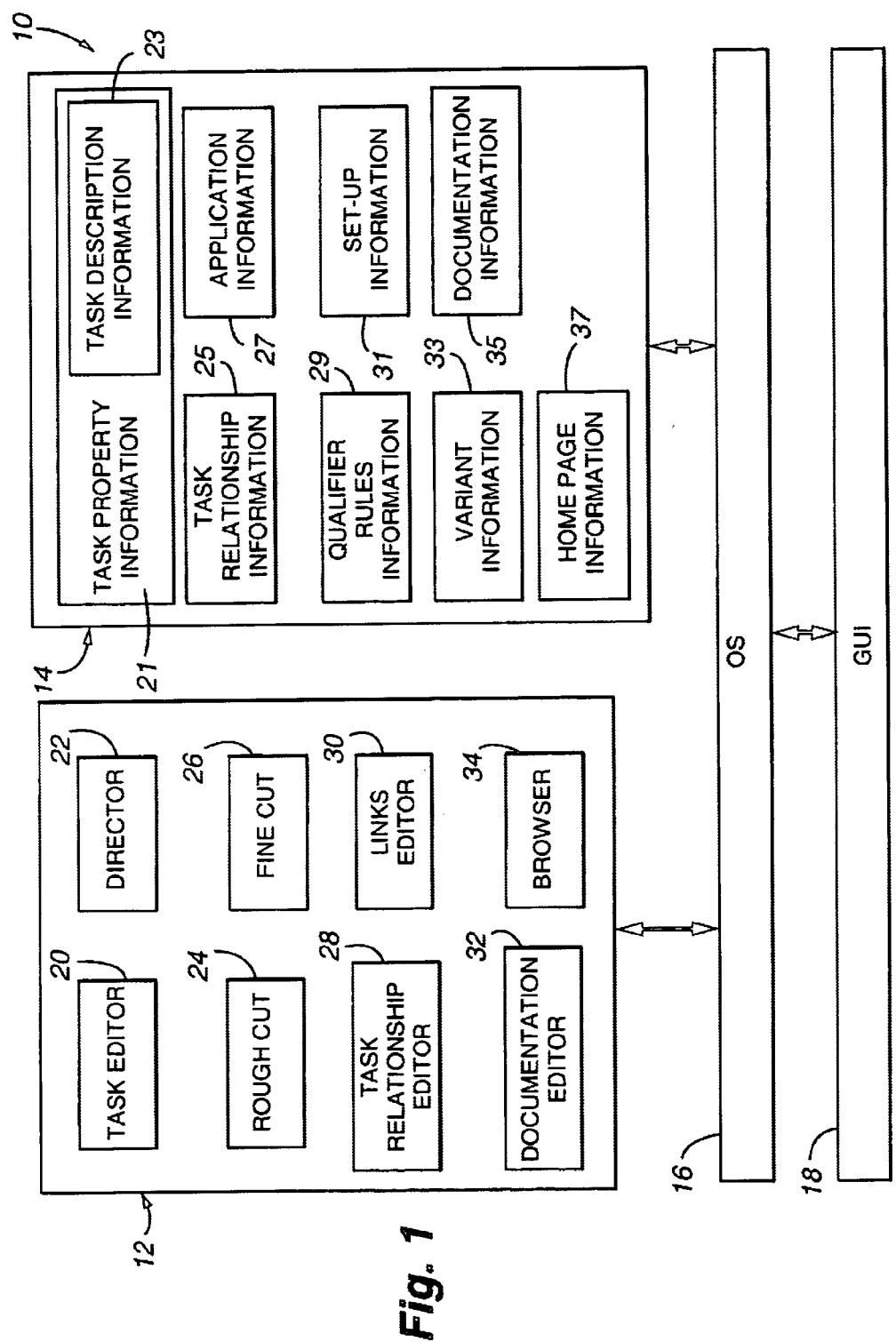
FIG. 1 is a block diagram of a system for managing processes.

Referring now to the drawings, and more particularly to FIG. 1 thereof, there is shown a process management system 10 for managing processes and which is constructed in accordance with the present invention. In general, the processes include business processes and technical processes, where business processes relate to an enterprise's business operations and technical processes relate to implementation of the business operations through the enterprise's hardware and software systems. The process management system 10 enables the customization and adaptation of existing processes, as well as the creation of new processes, for an enterprise in accordance with a method of the present invention.

To facilitate the management of the processes, the process management system 10 includes a group of process management tools 12 in data communication with process information 14 through an operating system 16. The operating system 16 is preferably the WINDOWS NT operating system marketed by Microsoft Corporation of Redmond, Wash. A graphical user interface ("GUI") 18 overlays the operating system 16 to facilitate user interaction with the process management tools 12, and can be constructed using the VISUAL C++ development system also marketed by the Microsoft Corporation of Redmond, Wash.

Process Architecture

A process can be characterized as including one or more steps leading to an end result where each one of the steps corresponds to a task for a user to complete. The tasks are reusable units of work that can be incorporated into one or more of the processes, where each process is defined by a relationship between the tasks. The tasks can represent software events as well as non-software events. A software event corresponds to the execution of a software application while a non-software event corresponds to a manual action to be executed by the user. The process management system 10 manages the tasks, as well as the relationship between the tasks, to enable the customization of an enterprise's processes.

Considering now the process information 14 in greater detail, the process information 14 includes task property information 21 and application information 27. The task property information 21 is indicative of a group of the tasks, and the application information 27 defines software applications that may be associated with the tasks. The process information 14 further includes task relationship information 25 that identifies the relationships between the tasks to define each one of the processes.

In the preferred embodiment of the present invention, the process information 14 defines a default enable display setting for all of the tasks. The default display setting initially enables the display of the entire group of tasks and all of the processes defined by the task relationships. As an enterprise may not require the entire group of processes, the display settings for the tasks that are not associated with the groups of processes utilized by enterprise can be disabled to permit the display of a sub-group of the tasks corresponding to the processes that will be used by the enterprise. This sub-group of tasks is arranged in a task view defined by the task relationship information 25. Further refinements of the display settings are also possible to further customize the enterprise's processes according to particular functions of the enterprise.

Figure 2:
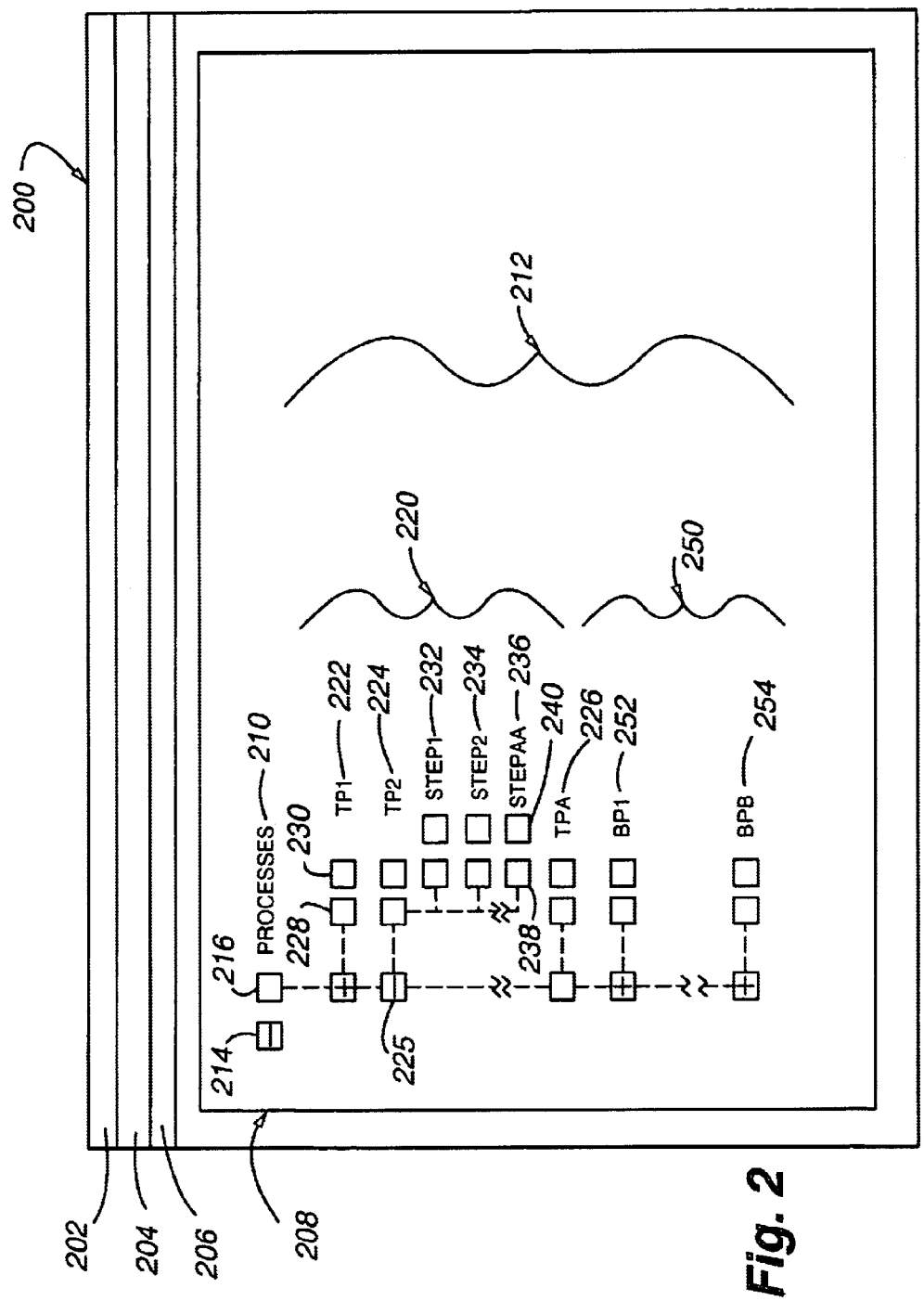
FIG. 2 is a process interface for the system of FIG. 1.

The GUI 18 accesses the task property information 21 and the task relationship information 25 25 to present a process interface 200 (FIG. 2). The interface 200 includes a title bar 202, a menu bar 204, a tool bar 206 and a task view window 208. The task view window 208 displays a group of tasks 212 that are arranged relative to one another to define a group of technical processes 220 and a group of business processes 250. One skilled in the art will appreciate that processes other than business and technical processes may be displayed, or that only one type of process may be displayed at any one time.

The technical process group 220 is displayed as a hierarchical tree arrangement of tasks 222, 224, 226, 232, 234 and 236 under a root node task 210. The tasks 222, 224, 226, 232, 234 and 236, as well as the root node task 210, are defined by the task information 21 and are arranged in parent/child relationships defined by the task relationship information 25. As shown in FIG. 2, tasks 222, 224 and 226 are child tasks of the root node task 210. Each one of the displayed child tasks 222, 224 and 226 represents an available technical process. Tasks 232, 234 and 236 are child tasks of task 224 and represent individual steps of the technical process associated with task 224. Additional levels of child tasks, for example child tasks of tasks 232, 234 and 236, can also be associated with the process of task 224.

While the tasks, such as the tasks 222, 224, 226, 232, 234 and 236, are displayed as elements of the process, the execution of one or more of the tasks may be optional. Thus, some processes may be completed without executing every one of the tasks associated with the process.

A collapse/expand icon 214 associated with the root node task 210 indicates that the node 210 has one or more child tasks. Similarly, the task 224 has a collapse/expand icon 225 to indicate the presence of one or more child tasks under the task 224. The tasks 222, 224 and 226, as well as their child tasks such as the child tasks 232, 234 and 236, also have status icons 228 and 238, respectively, to indicate whether a process or individual steps of a process have been completed. Type icons 216, 230 and 240 indicate whether the associated task is associated with a software event or a non-software event.

The business process group 250 is substantially similar to the technical process group 220, and includes a hierarchical tree arrangement of tasks, including tasks 252 and 254, under the root node task 210. The tasks 252 and 254 are also defined by the task information 21, and are arranged in parent/child relationships defined by the task relationship information 25.

To facilitate the identification of the tasks 210, 222, 224, 226, 232, 234, 236, 252 and 254 in the interface 200, the task property information 21 includes task description information 23 for each one of the tasks 210, 222, 224, 226, 232, 234, 236, 252 and 254. The task description information 23 for each available task is displayed in the window 208, wherein a desired one of the tasks can be selected from the window 208. In the example shown in FIG. 2, the task description information 23 is indicative of the text "PROCESSES" for the root node task 210, "TP2" for the task 224, and "STEP1" for the task 232.

In use, the GUI 18 accesses the task property information 21 and the task relationship information 25 to display the available tasks, such as the tasks 210, 222, 224, 226, 232, 234, 236, 252 and 254. The tasks 210, 222, 224, 226, 232, 234, 236, 252 and 254 are arranged in parent/child relationships according to the task relationship information 25 to define the technical and business processes, such as the group 220 of technical processes TP1, TP2 and TPA associated with tasks 222, 224 and 226, and the group 250 of business processes BP1 and BPB associated with tasks 252 and 254.

In order to complete a process, such as the technical process TP2 associated with task 224, the child tasks 232, 234 and 236 associated with STEP 1, STEP 2 and STEPAA of the TP2 technical process are executed by the user, except where one or more of the tasks 232, 234 and 236 are optional. To execute the child tasks 232, 234 and 236, a desired one of the tasks 232, 234 and 236 is selected via the GUI 18. Where the selected one of the tasks 232, 234 and 236 is associated with a software event, the software event is executed according to the application information 27 (FIG. 1) to complete the process step. If the selected one of the tasks 232, 234 and 236 is associated with a non-software event, the non-software event is executed manually to complete the process step.

Upon executing the software or non-software event associated with the process step, the step status icon such as the icon 238 is updated to acknowledge the completion of the respective step. The remaining steps of the process are completed in a similar manner until all of the process steps are completed, and the process status icon such as the icon 228 is updated to indicate the completion of the process.

Figure 3:
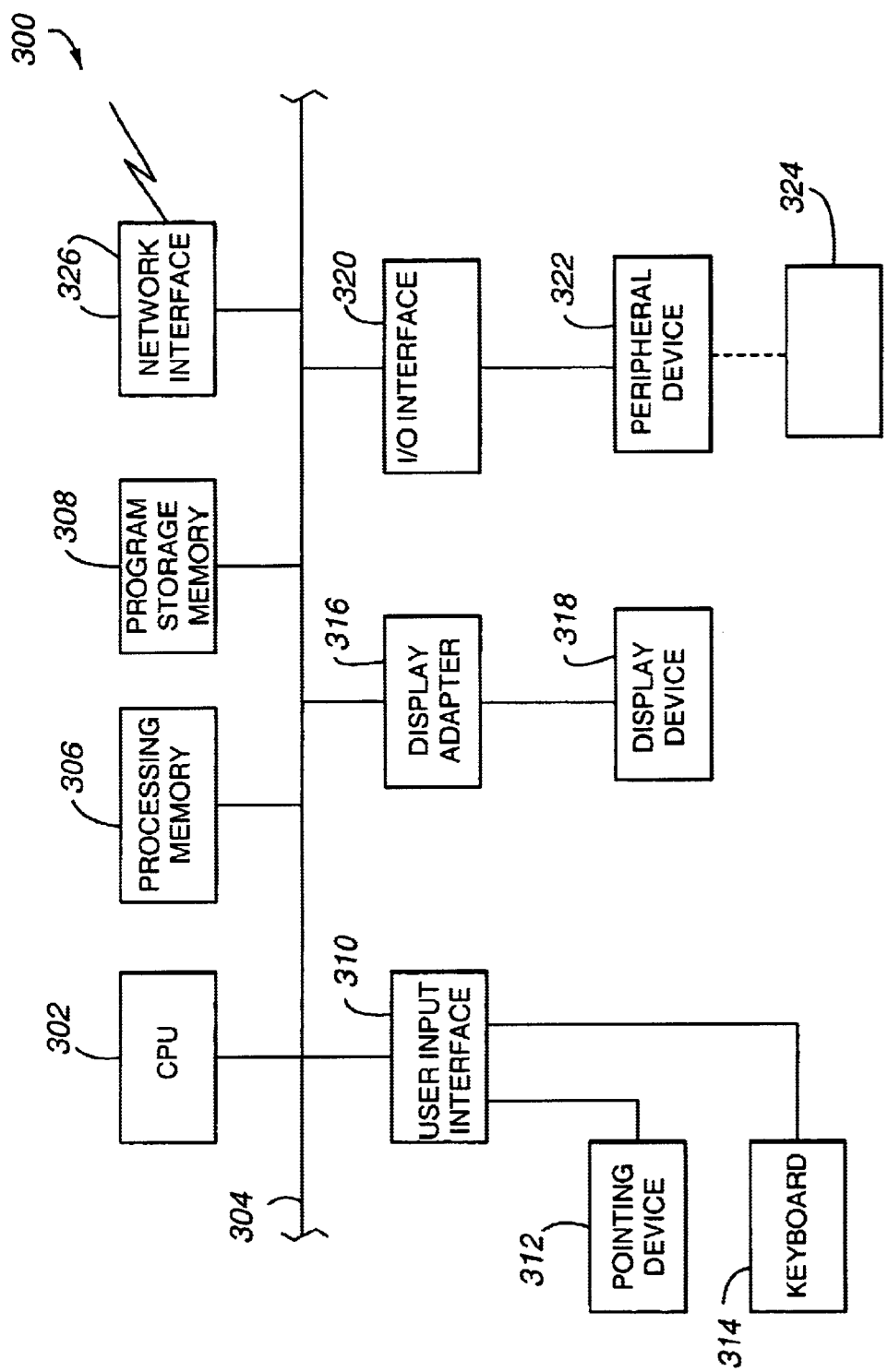
FIG. 3 is a block diagram of an information processing system for implementing the system of FIG. 1.

In the preferred embodiment, the system 10 is implemented in a general purpose computing or information processing system 300 (FIG. 3). The processing system 300 includes a central processing unit ("CPU") 302 connected by a bus 304 to a processing storage or memory device 306 and a program/data storage or memory device 308.

The management tools 12, the process information 14, the operating system 16 and the GUI 18 (FIG. 1) are maintained on the program storage device 308, and copied to the processing storage device 306, to help control the operation of the CPU 302 in accordance with the present invention.

The processing system 300 further includes a user input interface 310 connected to the bus 304 for enabling a user to interact with the GUI 18 (FIG. 1) via a pointing device 312, such as a mouse, and also with a keyboard device 314. To provide a visual display of the GUI 18, the processing system 300 also includes a display device 318 connected to the bus 304 through a display adapter 316.

An input/output ("I/O") interface 320 is connected to the bus 304 to permit a peripheral device 322 to interface with the processing system 300. The peripheral device 322 includes a disk drive for reading and/or writing electronic information to computer-usable storage medium such as a magnetic disk 324. Other peripheral devices, including tape drives and compact disk drives, can also be incorporated into the processing system 300.

A network interface 326 is also connected to the bus 304 to enable the processing system 300 to share electronic information with other processing systems (not shown).

Considering now the architecture of the processes in greater detail with reference to FIGS. 4–10, the system 10 utilizes a group of tasks including tasks 401–417 (FIG. 4) to function as building blocks for modeling the technical and business processes, where the task property information 21 (FIG. 1) is indicative of the tasks 401–417. The tasks 401–417 are associated with one another according to the task relationship information 25 to define a group of task relationships 601–620 (FIG. 6) and the processes associated with the task relationships 601–620.

A task view window, such as the task view window 208, displays only a sub-group of all of the available tasks 401–417 that can be displayed by the GUI 18 (FIG. 1). Other task views can be defined by the task relationship information 25 so that each one of the task views is associated with an operation within the enterprise. The processes defined by the task relationship information 25 can be associated with one or more of the task views, and can appear more than once within the same task view.

The tasks 401–417 represent software and non-software events, where software events relate to the execution of a software application. The application information 27 (FIG. 1) defines a group of software applications including the applications 501–511 (FIG. 5) that can be associated with the tasks 401–417 to define the software events to be executed. The application information 25 further includes version information for the software applications 501–511 to enable the tasks 401–417 to execute variations of the applications 501–511.

Figure 10:
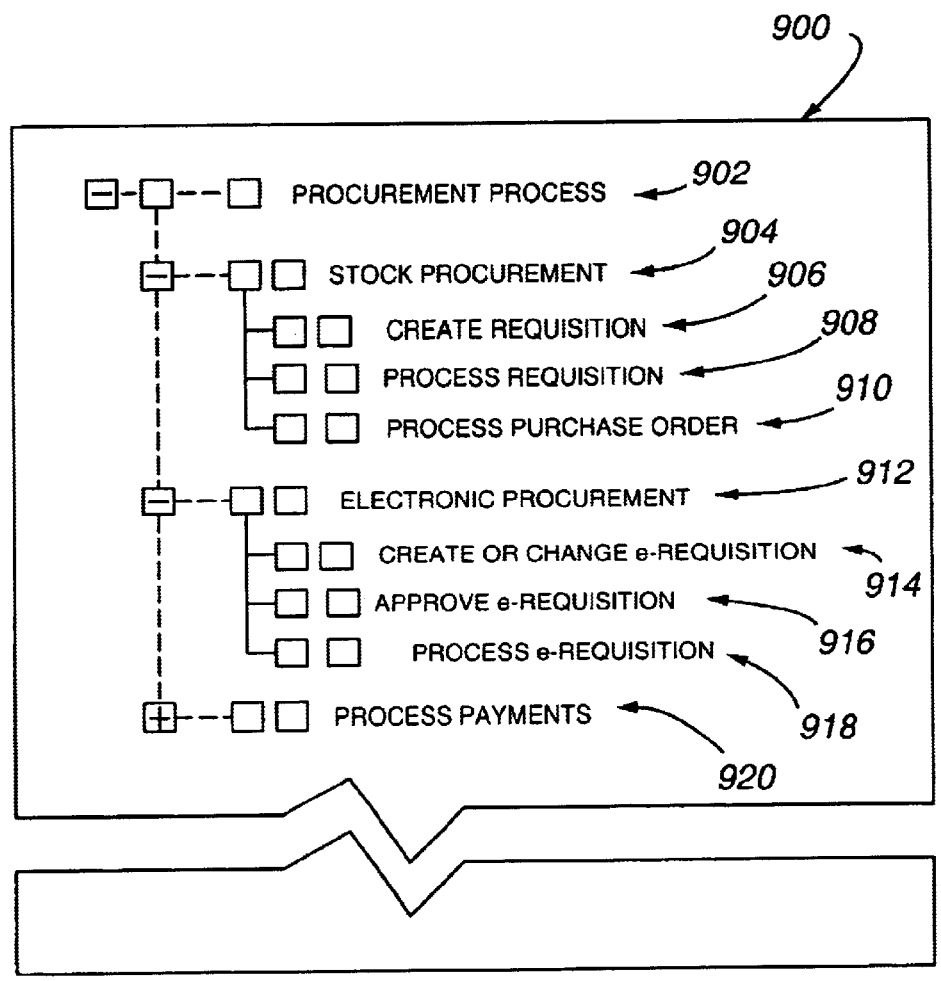
FIG. 10 is a task view window incorporating the task property information of FIG. 7 and the task relationship information of FIG. 8.

To aid in the understanding of the system 10, the FIGS. 4–10 illustrate an enterprise procurement operation including a stock procurement process, an electronic procurement operation and a payment processing process. A task view window 900 (FIG. 10) shows a subset of the tasks 401–417 arranged according to the task relationship information 25 to define the procurement processes, and displays tasks 902, 904, 906, 908, 910, 912, 914, 916, 918 and 920 associated with the procurement processes. As shown in FIG. 10, the tasks 902, 904, 906, 908 and 910 are associated with the stock procurement process, the tasks 902, 912, 914, 916 and 918 are associated with the electronic procurement process, and the tasks 902 and 920 are associated with the payment processing process. These processes are examples only, and many other processes can be utilized in conjunction with the system 10.

Figure 4:
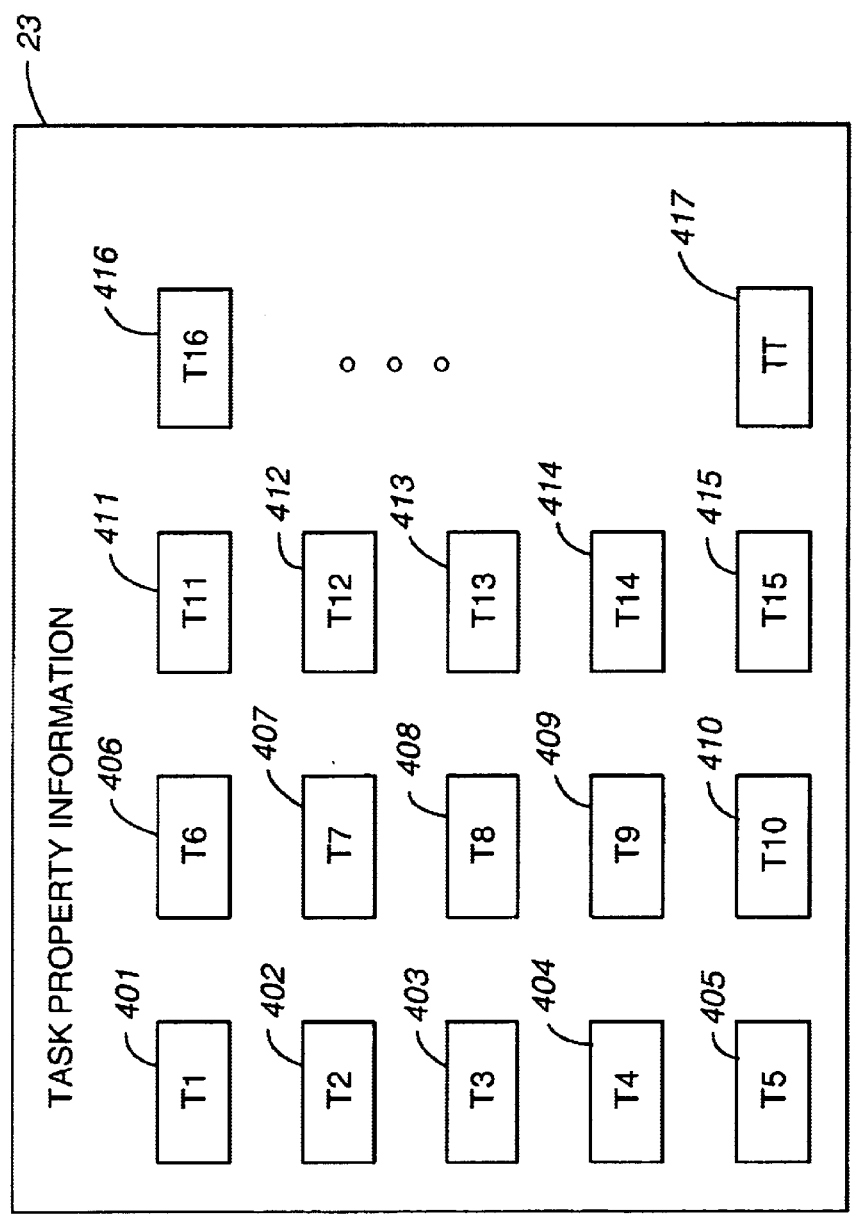
FIG. 4 is a block diagram of task property information maintained by the system of FIG. 1.
Figure 5:
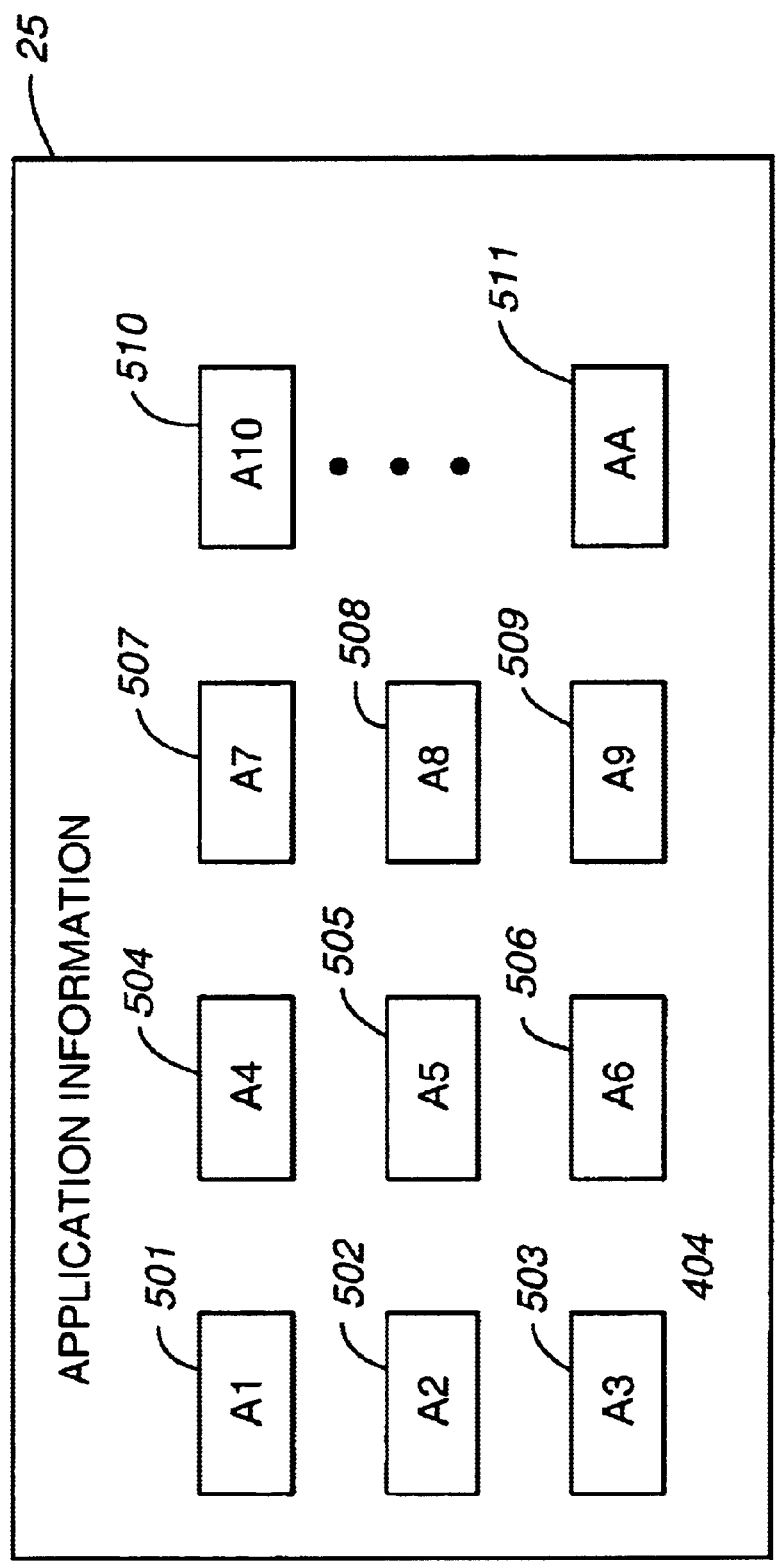
FIG. 5 is a block diagram of application information maintained by the system of FIG. 1.
Figure 6:
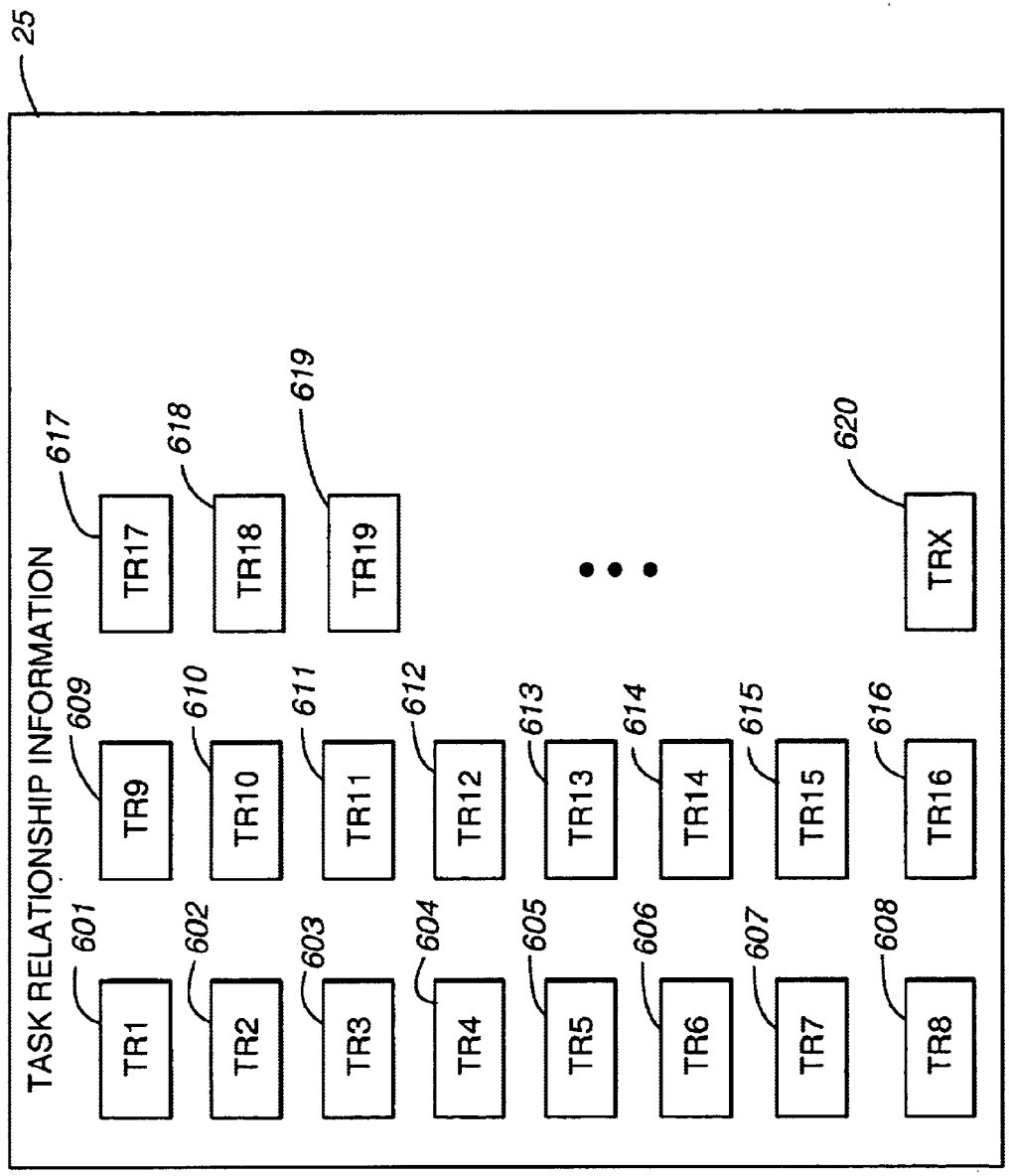
FIG. 6 is block diagram of task relationship information maintained by the system of FIG. 1.

The task property information 21 corresponding to the tasks 401–417 is shown in table 700 (FIG. 7). The table 700 includes task ID information 702, task description information 704, task type information 706, application identification information 708, task level active flag information 710, activator information 712, rough cut rule ID information 714, link information 716, and system code information 718. The task ID information 702 identifies the tasks 401–417 (FIG. 4). The task description information 704 corresponds to the task description information 23 (FIG. 1) and identifies the text to be displayed by the GUI 18 (FIG. 1) for each one of the tasks 401–417.

The task type information 706 identifies whether the task is a software event ("S/W") or a non-software event ("NON S/W"). For the tasks 401–417 that are identified as software events, the applications 501–511 (FIG. 5) corresponding to the software events are identified in the application identification information 708.

The task level flag information 710 identifies the display setting for the tasks 401–417 at a global level. In this regard, an indication that the setting is enabled ("Y") will result in the associated task 401–417 being displayed in all of the task relationships 601–620 unless the display setting for the task 401–417 is disabled in the task relationships 601–620.

As described in greater detail below, the tasks 401–417 for a process can be executed sequentially under the control of a wizard or universal director 22 (FIG. 1). The activator information 712 enables the tasks 401–417 to be identified as initiating tasks for the process, and enables the selection of the initiating task to launch the director 22 for executing sequentially the child tasks of the process.

The rough cut rule ID information 714 identifies qualifier rules that are maintained as qualifier rules information 29 (FIG. 1) and which are associated with the tasks 401–417. As described in greater detail below, the qualifier rules enable the display of the tasks 401–417 to be limited based on answers provided by the user. By limiting the number of available tasks 401–417, the GUI 18 (FIG. 1) can be customized to meet the requirements of the enterprise as described below in more detail in the section entitled Rough Cut.

The link information 716 identifies tasks ("linked tasks") and their associated task views that are linked to the tasks 401–417 ("linking tasks"). As described in more detail below, the link information 716 acts as a short cut to the linked task from the linking task, and also enables the linked task to be launched from the linking task.

The system code information 718 identifies the enterprise operations that the tasks 401–417 are associated with. For example, the procurement operations of the enterprise may be designated with the system code 06 while the human resources operations may be designated with the system code 10.

Considering now the task relationships 601–620 that define the processes in greater detail with reference to FIGS. 6, 8, 9 and 10, the task relationship information 25 (FIG. 1) defines a group of processes by associating one or more of the tasks 401–417 (FIG. 4). It is the relationship of the tasks 401–417 as determined by the task relationship information 25 that defines the stock procurement, electronic procurement and payment processing processes of FIG. 10.

The task relationship information 25 is described in a task relationship table 800 (FIG. 8). The table 800 identifies task view information 802, parent task information 804, child task information 806, variant ID information 808, task relationship active flag information 810, link information 812 and rough cut ID information 814. The task view information 802 identifies the task views associated with the task relationships 601–620. The parent task information 804 and the child task information 806 define the parent/child relationships for the tasks 401–417 to determine the task relationships 601–620.

The variant ID information 808 identifies one or more variants for the parent/child relationships. The variants are defined by variant information 33 (FIG. 1) and are described in a variant table 850 (FIG. 9), and enable the active flag information 710 (FIG. 7) and the task description information 704 to be overridden. The variants also enable a variant version for an application 501–511 (FIG. 5) to be identified to permit a modified execution of a software event.

The variant table 850 includes variant ID information 852, variant name information 854, variant description information 856 and variant version information 858. The variant ID information 852 and the variant name information identify the variant, while the variant description information 856 is similar to the task description information 23 and indicates the name of the task that will be displayed according to the variant. The variant version information 858 identifies the application version that will be utilized in the execution of the variant.

As will be described in greater detail under the section entitled Fine Cut below, the display of the tasks 401–417 (FIG. 4) in the task view windows, such as the task view window 900 (FIG. 10), can be selectively determined. The task relationship active flag information 810 identifies the display setting for the tasks 401–417 at the task relationship level. In this regard, the display setting identified in the task level active flag information 710 (FIG. 7) can be selectively overridden at the task relationship level.

The link information 812 identifies one or more of the tasks 401–417, and the task views associated with desired ones of the tasks 401–417, that are linked to the parent/child task relationships defined by the parent/child task ID information 804 and 806. The linking of the tasks 401–417 is described in more detail below under the section entitled Linking.

The rough cut rule ID information 814 is substantially similar to the rough cut rule ID information 714 (FIG. 7), and identifies qualifier rules associated with the tasks 401–417.

Considering now the task view window 900 of FIG. 10 in greater detail, the task view window 900 corresponds to a TV1 task view. The task relationship table 800 (FIG. 8) identifies the TV1 task view, the subset of tasks 401–417 that are associated with the TV1 task view, and also identifies the parent/child relationships between the subset of tasks 401–417. In the present example, the parent/child relationships identified in the parent task ID information 804 and the child task ID information 806 define the stock procurement, the electronic procurement and the payment processing processes as operations within the procurement processes operations of the enterprise.

The task properties table 700 (FIG. 7) identifies the task description information to be displayed in the task view window 900 for each of the tasks 906, 908, 910, 914, 916 and 918, corresponding to a subset of the tasks 401–417 identified in the table 800 as being associated with the TV1 task view. The table 800 also indicates if a software application will be launched upon selecting the tasks 906, 908, 910, 914, 916 and 918 from the window 900. In the present example, selecting the tasks 906, 908, 910, 914, 916 and 918 from the window 900 will launch the software applications 501, 502, 503, 504, 505 and 506, respectively.

A V1 variant for the "STOCK PROCUREMENT" process of FIG. 10 would disable the display of the tasks 906 and 908 for a "PLANNED STOCK PROCUREMENT"

process as determined by the task relationship information of FIG. 8 and the variant information of FIG. 9.

A V2 variant would keep the display status for the tasks 906 and 908 as enabled, but would replace the description displayed in the window 900 for task 910 with "PROCESS PURCHASE ORDER FOR NON-STOCK ITEM." In addition, a variant A10 software application 510 would be executed instead of the A3 software application 503 as identified in the table 700 for the T8 task 408.

Task Customization

Figure 11:
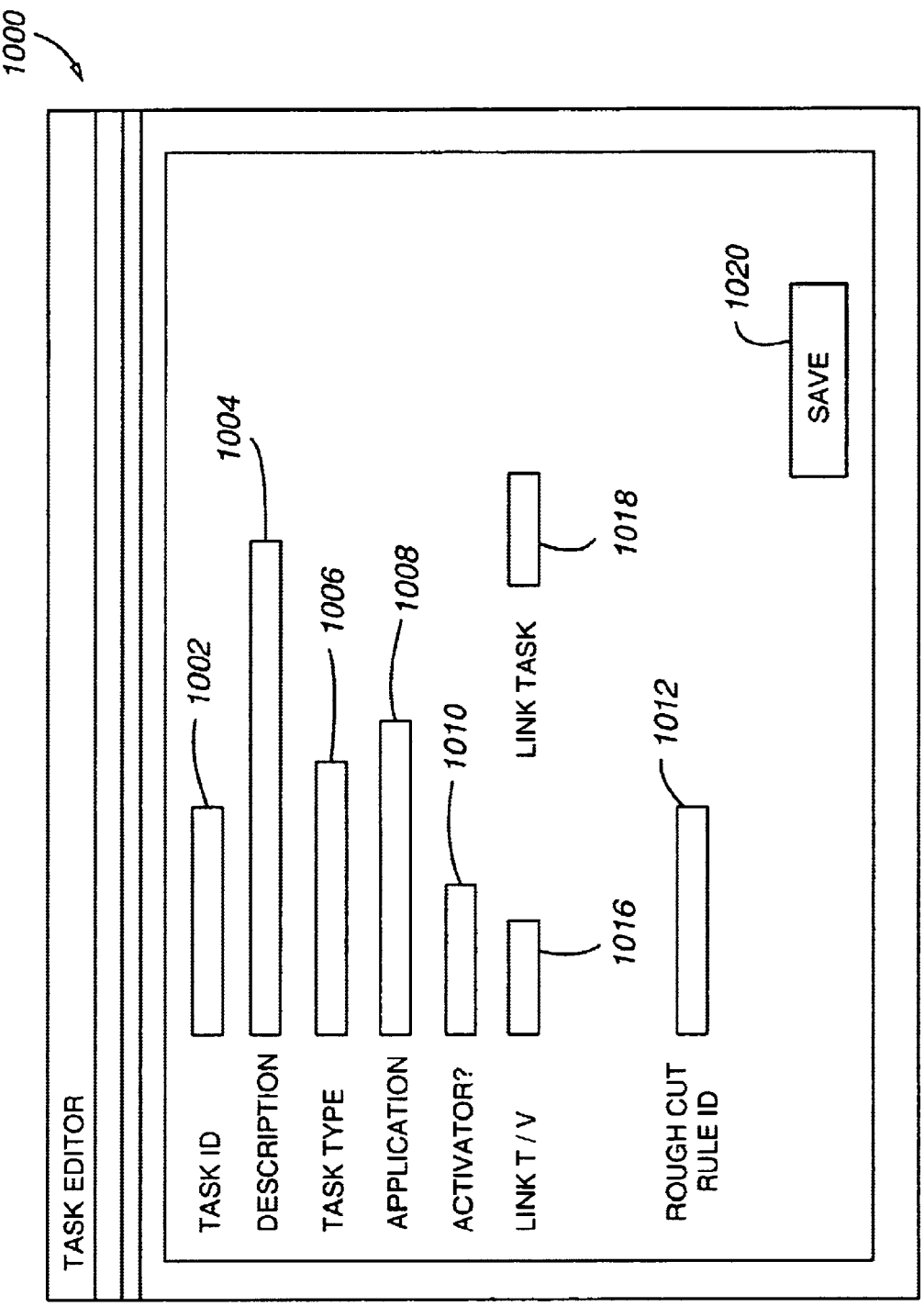
FIG. 11 is a task editor interface for updating the task property information of FIG. 7.

Considering now the customization of the tasks 401–417 with reference to FIGS. 1, 7 and 11, the process management tools 12 include a task editor 20 (FIG. 1) for modifying the tasks 401–417 and for creating new tasks. When launched from the GUI 18 (FIG. 1), the task editor 20 generates a task editor interface 1000 (FIG. 11) that enables the task property information table 700 (FIG. 7) to be updated for a selected one of the tasks 401–417. The task editor interface 1000 includes a task ID box 1002 that displays the task ID information 702 (FIG. 7) for the selected task, and a task description text box 1004 for displaying the task description information 704 for the selected task. The task description information 704 can be updated by modifying the text displayed in the box 1004.

A task type text box 1006 enables the task type information 706 to be updated, and an application text box 1008 enables the application information 708 to be updated.

The interface 1000 further includes an activator identification text box 1010 for updating the activator information 712. A link task view box 1016 and a link task box 1018 enable the link information 716 to be updated, and a rough cut rule ID text box 1012 enables the updating of the rough cut rule ID information 714.

A save button 1020 enables the information entered in the text boxes 1002, 1004, 1006, 1008, 1010, 1012, 1016 and 1018 to be saved in the table 700.

In use, an edit dialog box (not shown) can be displayed from the text view window 900, for example by using a right mouse click, to present the options of modifying an existing task or adding a new task. Selecting either of these options will generate the interface 1000. Where an existing task is to be modified, the existing task ID information 702 for the selected task is presented in the box 1002. The text boxes 1004, 1006, 1008, 1010, 1012, 1016 and 1018 are then populated with the appropriate information from the table 700 for the selected task. Once the desired revisions are made within the text boxes 1004, 1006, 1008, 1010, 1012, 1016 and 1018, the save button 1020 is selected and the revisions are stored in the table 700.

Where a new task is to be added, the system 10 automatically generates new task ID information 702 for the new task, and the new task ID information 702 is then displayed in the box 1002. A description for the new task is then entered in the box 1004 to identify the new task in a text view window, such as the window 900. The task type for the new task is identified in box 1006, and where the task type indicates the new task is associated with a software event, application identification information for the new task is entered into the box 1008.

If the new task is an activator, an appropriate indication is made in the box 1010. A task view and task within the task view are identified in boxes 1016 and 1018 as being linked to the new task. The rough cut rule ID information for the new task can be entered in the box 1012 when applicable. The save button 1020 is then selected to save the information for the new task in the table 700.

Task Relationship Customization

Figure 12:
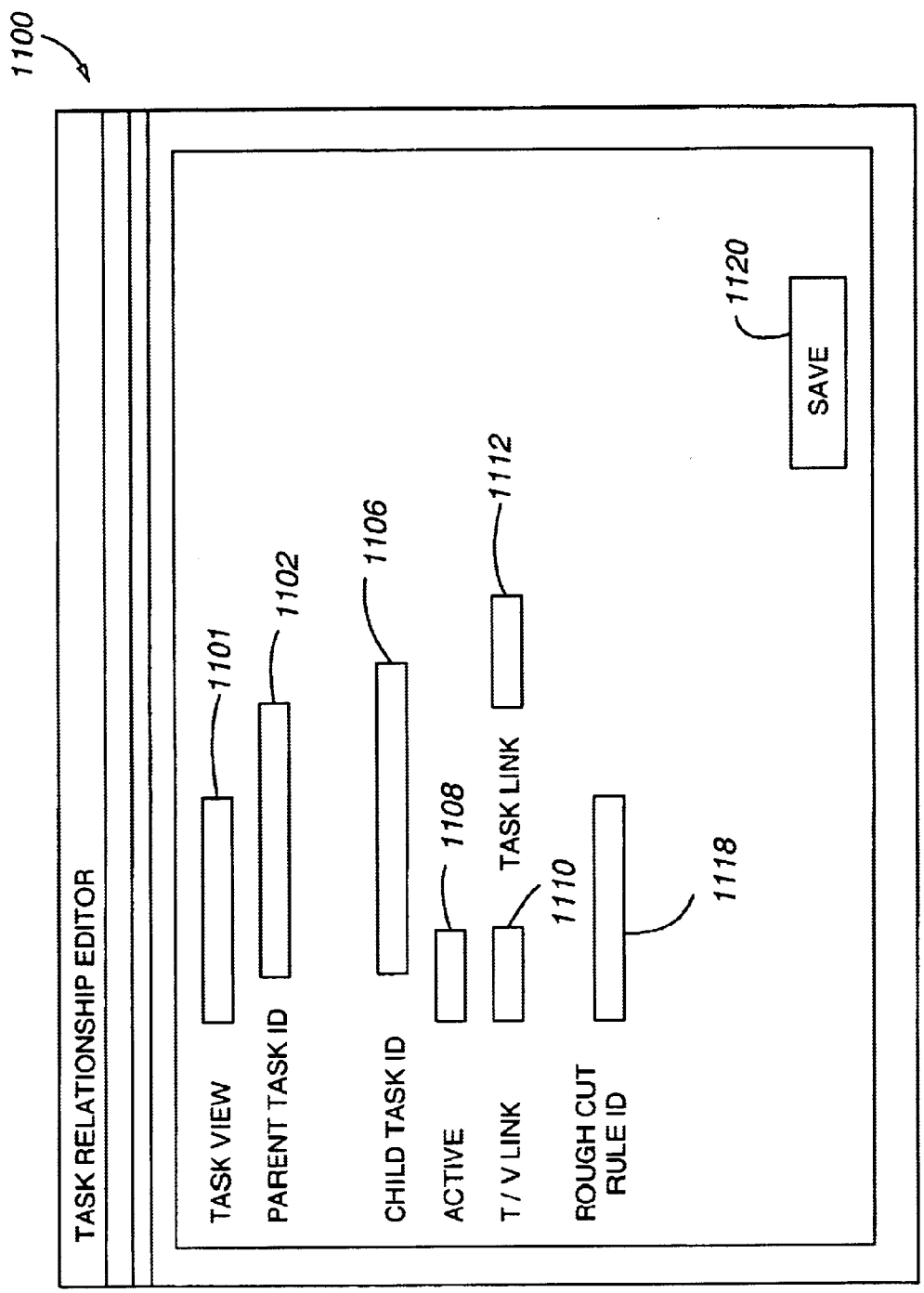
FIG. 12 is a task relationship editor interface for updating the task relationship information of FIG. 8.

Considering now the customization of the task relationships 601–620 (FIG. 6) with reference to FIGS. 1, 8 and 12, the process management tools 12 further include a task relationship editor 28 (FIG. 1) for revising the relationships between the tasks 401–417 to modify the task relationships, and for creating new processes. When launched from the GUI 18 (FIG. 1), the task relationship editor 28 generates a task relationship editor interface 1100 (FIG. 12). The editor interface 1100 is similar to the editor interface 1000, and enables the task relationship information table 800 (FIG. 8) to be updated.

The task relationship editor interface 1100 includes a task view ID box 1101 that displays the task view ID information 802, a parent task ID box 1102 for displaying the parent ID information 804, and a child task ID box 1106 for displaying the child ID information 806.

An active status box 1108 permits the enabling and disabling of the active flag information 812 for the selected parent/child task relationship. A pair of link boxes 1110 and 1112 enable the user to identify a linked task for the selected task relationship.

The interface 1100 further includes a rough cut rule ID text box 1118 for updating the rough cut rule ID information 816, if desired.

A save button 1120 enables the information entered in the boxes 1101, 1102, 1106, 1108, 1110, 1112 and 1118 to be saved in the table 800.

In use, an edit dialog box (not shown) can be displayed from the text view window 900, for example by using a right mouse click, to present the options of modifying an existing task relationship or adding a new task relationship. Selecting either of these options will generate the interface 1100. Where an existing task relationship is to be modified, the existing task view ID information 802 for the selected task relationship is presented in the box 1101. The boxes 1102, 1106, 1108, 1110, 1112 and 1118 are then populated with the appropriate information from the table 800 for the selected task relationship. Once the desired revisions are made within the boxes 1102, 1106, 1108, 1110, 1112 and 1118, the save button 1120 is selected and the revisions are stored in the table 800.

Where a new task relationship is to be added, the desired selections for the boxes 1101, 1102, 1106, 1108, 1110, 1112 and 1118 are then made. The save button 1120 is then selected to save the information for the new task view in the table 800.

Universal Director

The process management tools 12 (FIG. 1) further include a universal director or wizard 22 for presenting the steps of a process in an order determined by the task relationship information 25. In this regard, the director 22 is launched by the selection of a task having activator information 712 (FIG. 7) identifying the task as an activator to present the subsequent tasks of the process in the order determined by the task relationship information 25.

Figure 13:
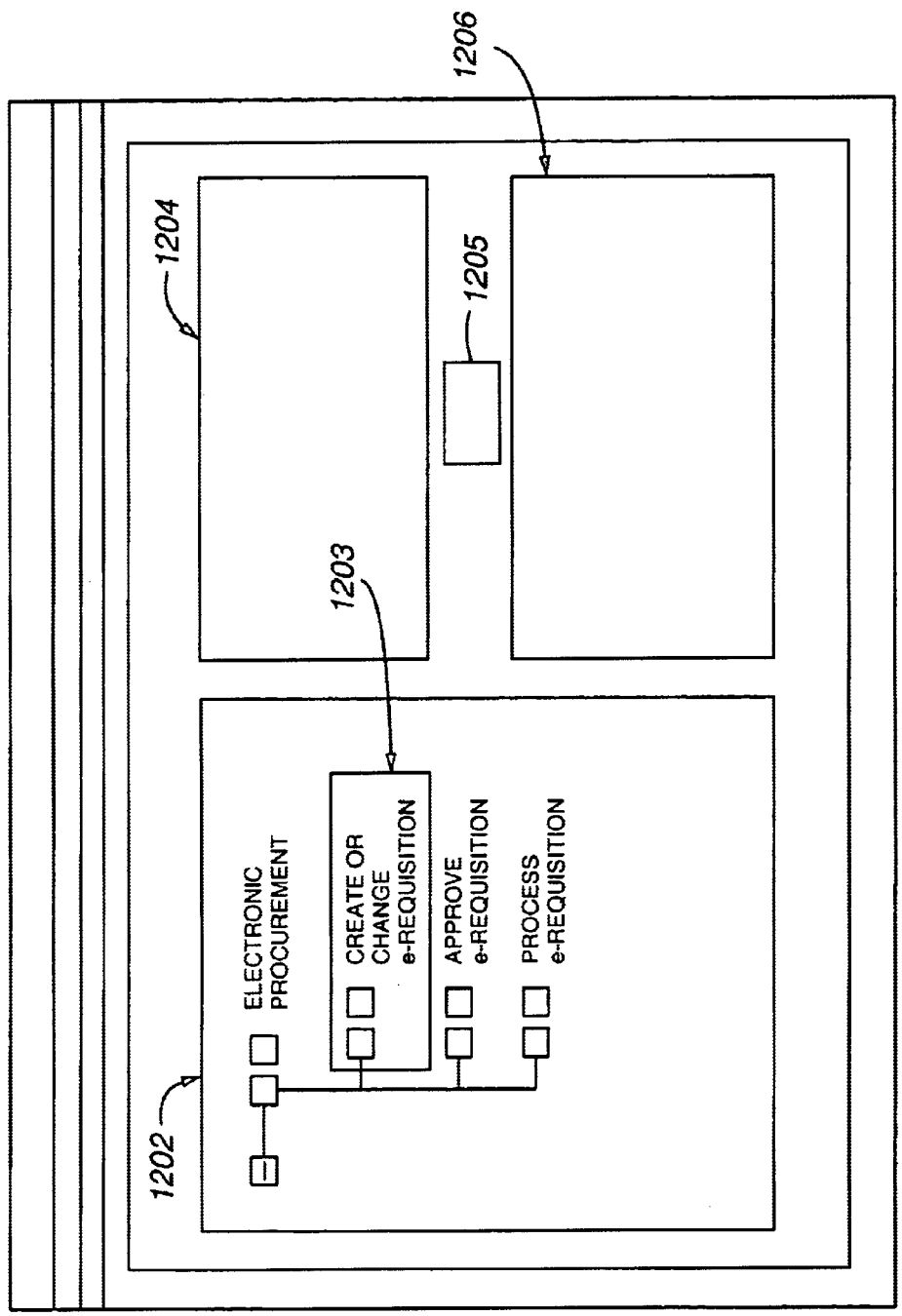
FIG. 13 is a universal director interface for executing the process steps.

For example, the "ELECTRONIC PROCUREMENT" task 912 (FIG. 10) is identified as being an activator in the activator information 712, and enables the ordering of items through an electronic procurement system by completing the tasks 914, 916 and 918. The task relationship information 25 identifies the tasks 914, 916 and 918 as child tasks of the task 912. Consequently, the selection of the step 912 from the task view window 900 launches the director 22 to generate a director interface 1200 (FIG. 13).

The interface 1200 includes a status window 1202 displaying the parent/child tasks associated with the selected task 912, an application window 1204 displaying the software application associated with the task being executed, if any, and a documentation window 1206 displaying documentation associated with the task being executed, if any. A status indicator 1203 identifies the task currently being executed as the "CREATE OR CHANGE e-REQUISITION" task 914 in FIG. 13. The application information 708 indicates that the A4 software application 504 (FIG. 5) is associated with the T10 task that corresponds to the task 914.

Consequently, the application window 1204 will display the operation of the A4 software application 504 while the status indicator 1203 is positioned on the task 914, and the documentation window 1206 will display documentation associated with the task 914.

The interface 1200 further includes a user acknowledgement control 1205 to indicate that the task was successfully executed.

Figure 14:
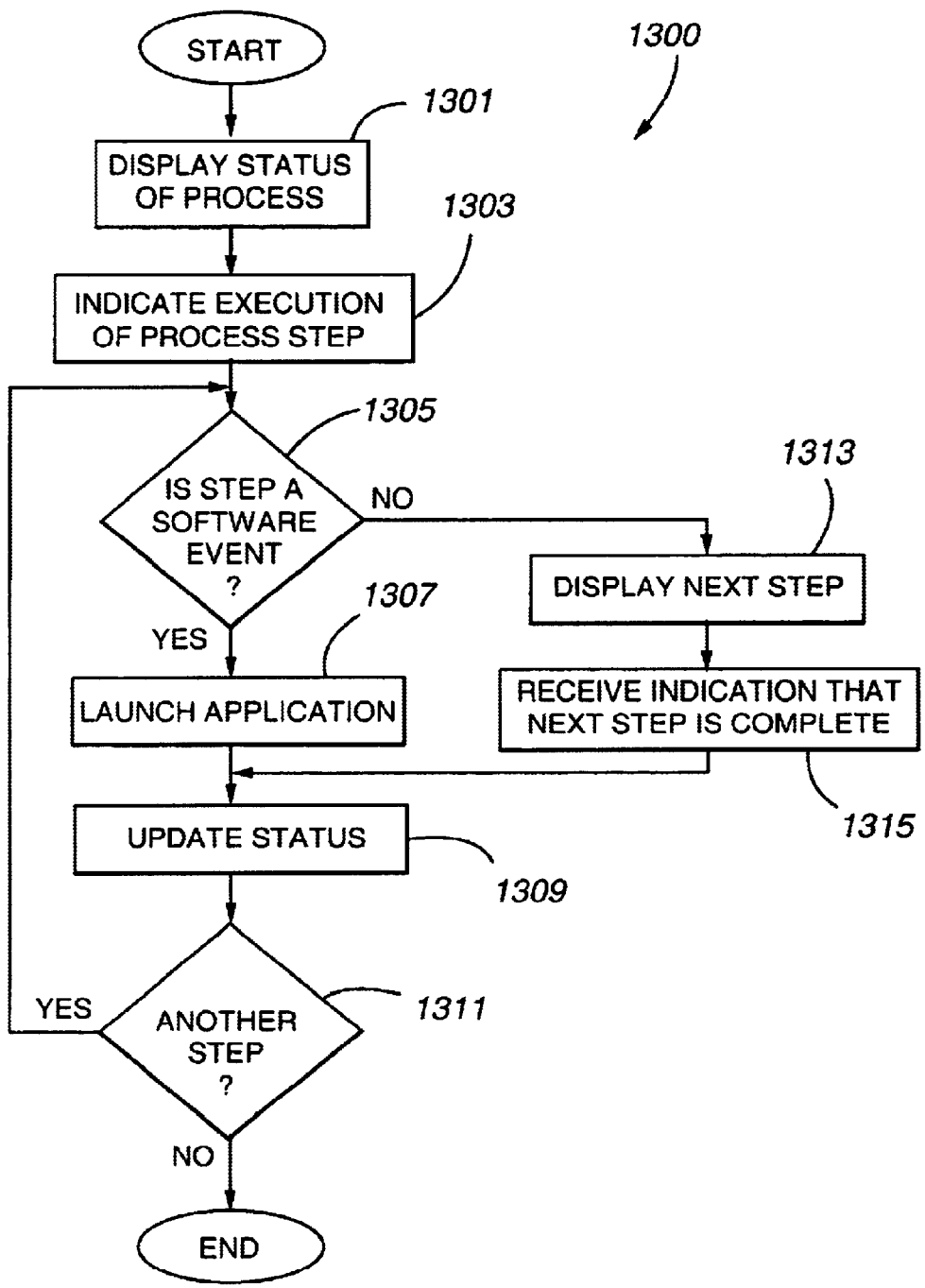
FIG. 14 is a flow chart describing the operation of a universal director application.

The operation of the director 22 is shown the flow chart 1300 (FIG. 14). Once the activator task, such as the task 912 (FIG. 10) is selected, the director 22 initially displays the status of the process in the status window 1202 (FIG. 13) at box 1301. The execution of the step corresponding to the activator task is then indicated in the status window 1202 at box 1303. A determination is made at decision box 1305 as to whether the process step is associated with a software event.

If the step is associated with a software event, the application is launched at box 1307. In the preferred embodiment, the application is launched in the application window 1204 to enable the status of the process and the application execution to be visible concurrently with one another. Upon completion of the application, the process status is updated at box 1309 before a decision is made at decision box 1311 as to whether there is another step in the process associated with the activator task. If there is another step, the operation returns to the decision box 1305. Otherwise, the operation is terminated.

Where it is determined at decision box 1305 that the step is not associated with a software event, the next step is displayed in the status window 1202 at box 1313. When the next step is complete, the user acknowledges the completion of the step by selecting the control 1205, wherein the acknowledgement is received at box 1315 and the status of the process is updated at box 1309. A determination is then made at the decision box 1311 regarding the existence of another step in the process, and the operation either returns to decision box 1305 if there is another step or the operation terminates if there is no other step.

Rough Cut

In the preferred embodiment of the present invention, the process information 14 (FIG. 1) pertains to a variety of enterprises. These enterprises can have operations in a number of industries, they can perform a variety of business activities, they can be located in many different parts of the world, and they can utilize a variety of hardware and operating platforms. Although the tasks 401–417 (FIG. 4) are re-usable and can be used with all of the enterprises, not all of the tasks 401–417 or task relationships 601–620 (FIG. 6) may be appropriate for use with all enterprises. For example, an enterprise that has no oil and gas operations will not need to use the subset of tasks 401–417 or subset of the task relationships 601–620 which are particular to the oil and gas industry. Similarly, an enterprise located in the United States of America will not need to access the subset of tasks 401–417 or subset of task relationships 601–620 which relate to the localization of accounting procedures in a country outside of the United States.

As a result of the tasks 401–417 being applicable to a variety of enterprise, the displaying of the entire group of tasks 401–417 by the GUI 18 (FIG. 1) can be overwhelming. In this regard, the default display setting for all of the tasks 401–417 is "Enable." Consequently, all of the tasks 401–417 will be displayed by the GUI 18, whether or not the tasks 401–417 are applicable to a particular enterprise, unless the display settings for a subset of the tasks 401–417 are modified to "Disable."

To limit the number of the tasks 401–417 and task relationships 601–620 that are displayed, the process management tools 12 include a rough cut tool 24 (FIG. 1). The rough cut tool 24 facilitates an initial user interview and enables the user to answer questions regarding the enterprise, including what industry or industries pertain to the enterprise, what geographical areas pertain to the enterprise, and what environment or environments does the enterprise utilize. As described in connection with FIGS. 7 and 8 above, each one of the tasks 401–417 and task relationships 601–620 may have associated rough cut rule ID information 714 and 814. The rough cut tool 24 utilizes the answers from the initial user interview and the rough cut rule ID information 714 and 814, in conjunction with qualifier rules information 29 (FIG. 1) and set-up information 31 of the process information 14, to determine which ones of the group of tasks 401–417 and task relationships 601–620 that will have their display settings disabled. In this way, the displaying of the tasks 401–417 and task relationships 601–620 can be restricted to those tasks 401–417 and task relationships 601–620 which apply to the enterprise.

The task property information table 700 also includes system code information 718 that identifies the operations which pertain to the tasks 401–417, and further aids in reducing the number of the tasks 401–417 to be displayed.

Figure 15:
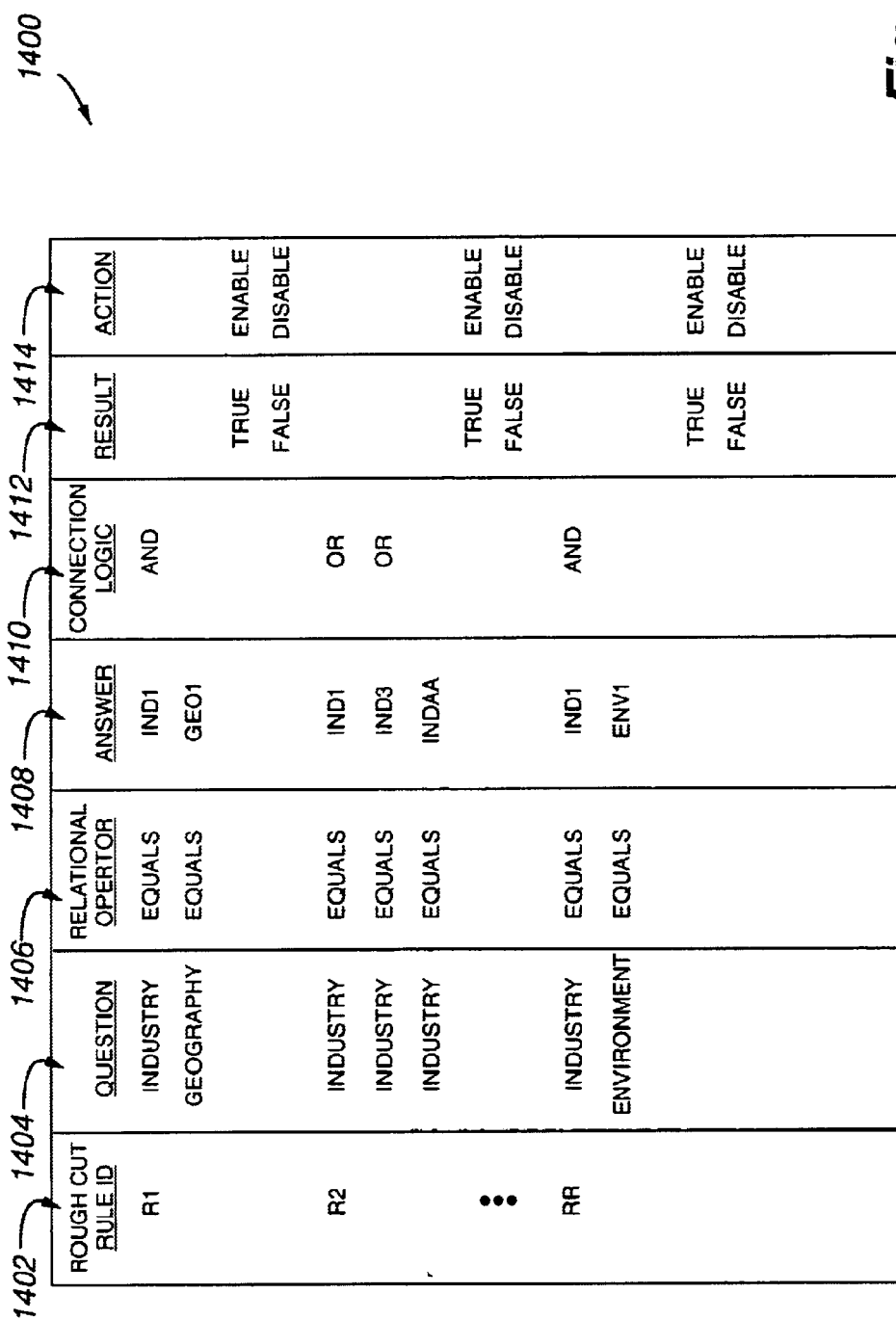
FIG. 15 is a table describing qualifier rules information maintained by the system of FIG. 1.
Figure 16:
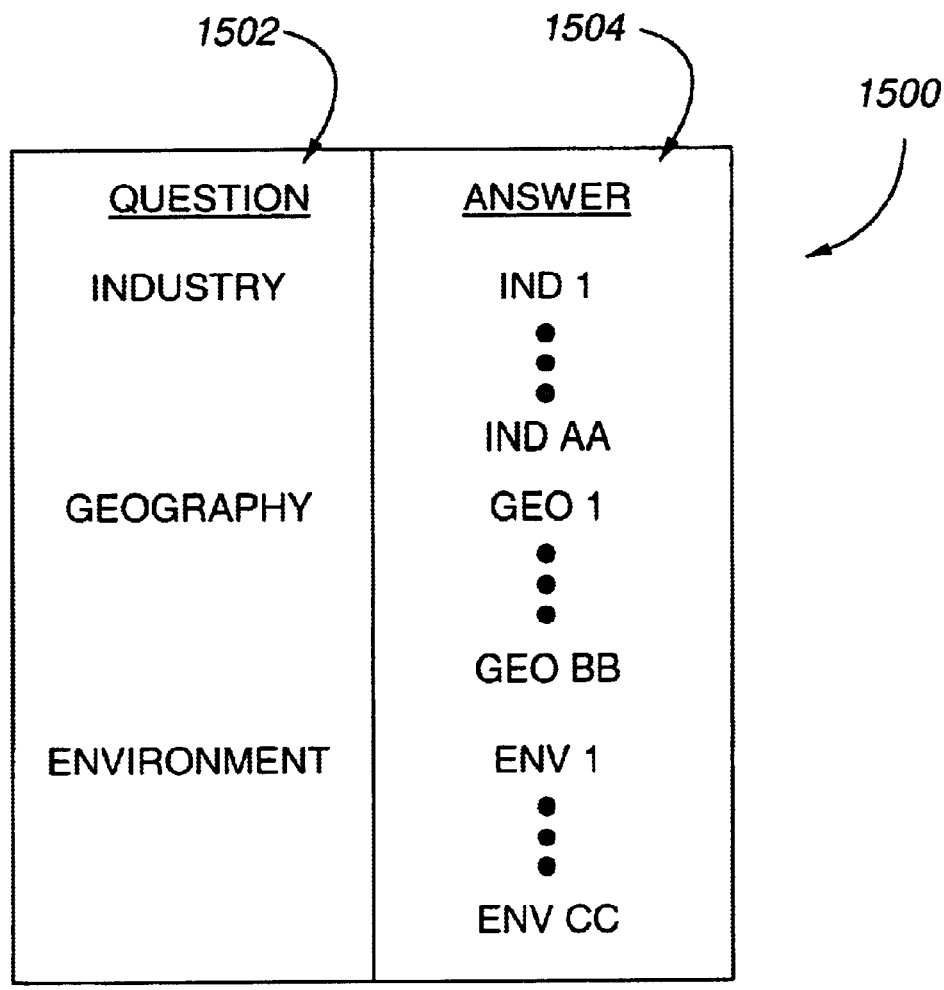
FIG. 16 is a table describing set-up information maintained by the system of FIG. 1.

Considering now the qualifier rules information 29 and the set-up information 31 in greater detail with reference to FIGS. 15 and 16, a table 1400 (FIG. 15) defines a group of rules R1 through RR according to the qualifier rules information 29. The table 1400 includes rough cut rule ID information 1402, question information 1404, relational operator information 1406, answer information 1408, connection logic information 1410, result information 1412 and action information 1414. The rough cut rule ID information 1402 identifies a group of rough cut rules including rules R1 through RR. The rules R1 through RR define IF-THEN statements, and are associated with the tasks 401–417 (FIG. 4) and the parent/child task relationships 601–620 in accordance with the rough cut rule ID information 714 (FIG. 7) and 814 (FIG. 8).

The question information 1404 identifies a question to be used in a logic statement. The relational operator information 1406 defines a relationship between question information 1404 and answer information 1408 in the logic statement. The connection logic information 1410 defines a connection between a plurality of logic statements associated with the same rule, such as rule R1. The result information 1412 corresponds to the "THEN" portion of the statement, and can identify the result of the statement as being either TRUE or FALSE. The action information 1414 indicates the display settings for the tasks 401–417 which are associated with the rough cut rule ID information 1402, and are set to ENABLE if the result information 1412 is indicative of TRUE, and are set to DISABLE if the result information 1412 is indicative of FALSE.

As an example, the rule R1 of table 1400 includes the IF-THEN statement: IF the answer to the question INDUSTRY equals IND1 and the answer to the question GEOG- RAPHY equals GEO1, THEN the display setting for the task should be ENABLE. Otherwise, the display setting should be DISABLE.

The set-up information 31 (FIG. 1) identifies the available answers for each one of the questions. A table 1500 (FIG. 16) describes the set-up information 31, and includes question information 1502 and answer information 1504. The answer information 1504 identifies the available answers corresponding to the question information 1502, and is used as the answer information 1408 in the table 1400 (FIG. 15). While the table 1500 identifies the available questions as GEOGRAPHY, INDUSTRY, and ENVIRONMENT, one skilled in the art will recognize that other questions are also contemplated within the scope of the present invention.

Figure 17:
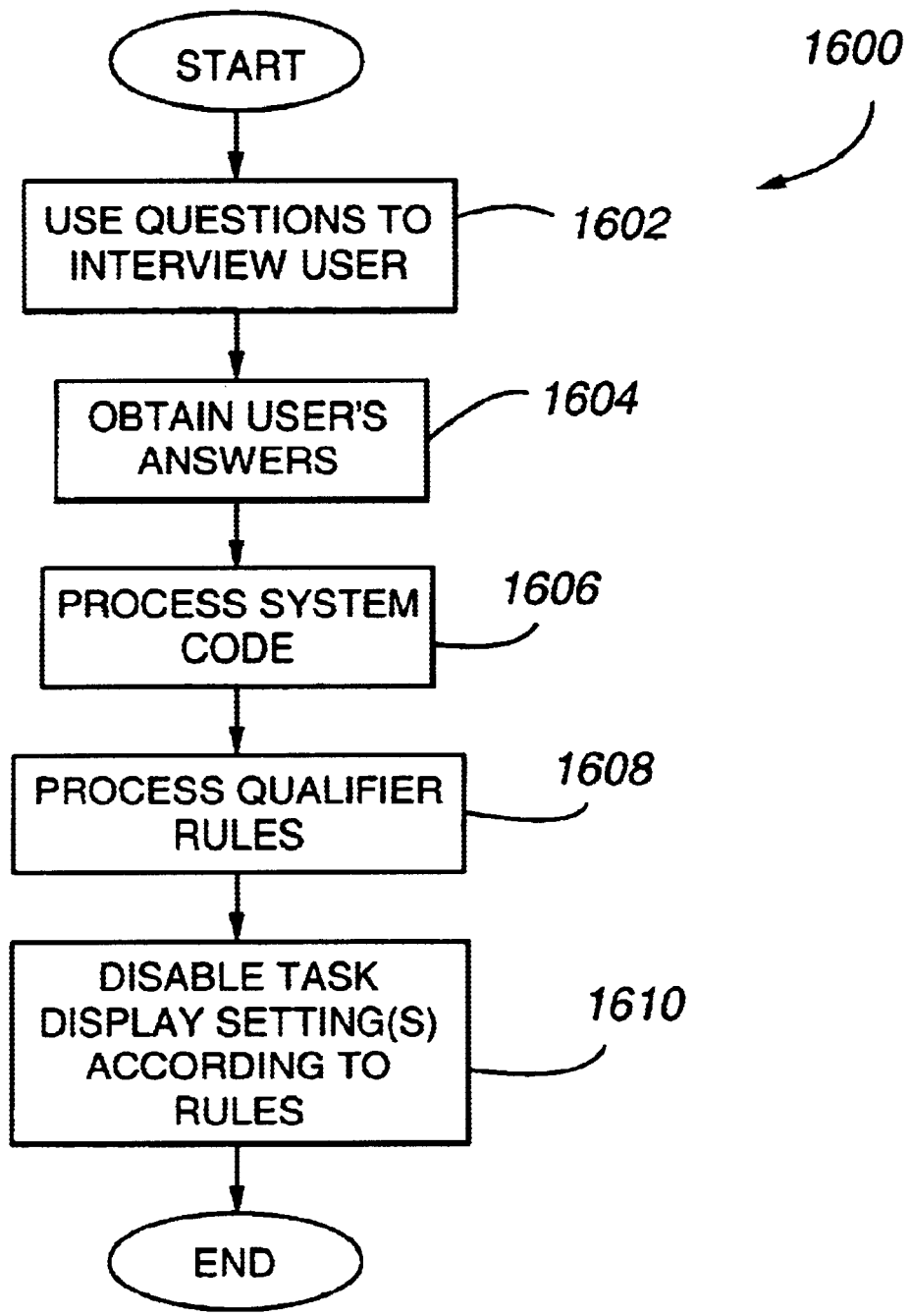
FIG. 17 is a flow chart describing the operation of a rough cut application.

The operation of the rough cut tool 24 is described in flow chart 1600 of FIG. 17. Initially, an interview is conducted at box 1602 using a set of questions, including the desired system code, geography, industry and environment. The user responses or answers to the questions are obtained at box 1604. The answer to the system code question is used to initially limit the displayed tasks to those having an appropriate system code at box 1606. The remaining answers to the questions presented in box 1602 are then applied to the rules 714 and 814 at box 1608, wherein the rules are processed using the user's answers and the set-up information 31 (FIG. 1). The task display settings for inapplicable tasks are set to DISABLE at box 1608. As a result, only applicable tasks are displayed to the user.

As the rough cut operation is a process, the rough cut process can be defined by tasks from the group of tasks including the tasks 401–417 (FIG. 4). Although the rough cut operation is intended to initially define which ones of the tasks 401–417 will be displayed, the rough cut operation can be used subsequently to modify the initial settings. For example, if the answers to the questions change, the rough cut operation can be used again to modify the initial settings.

Fine Cut

As described above, the same task can be used in more than one of the parent/child task relationships 601–620 (FIG. 6), and the same task can be used multiple times within the same task view. Using the rough cut tool 24 (FIG. 1) to modify the display settings for the tasks 401–417 (FIG. 4) affects every one of the parent/child task relationships 601–620 where the task appears. Consequently, by setting the display setting for a task to DISABLE using the rough cut tool 24 will prevent the task from being displayed in every one of the task relationships 601–620 which includes the task as defined by the task relationship information 25 (FIG. 1).

In order to set the display setting for a task to DISABLE in one of the task relationships 601–620 without affecting the display of the task 401–417 in any of the other task relationships 601–620, the process management tools 12 (FIG.1) further include a fine cut tool 26. Using the fine cut tool 26 enables the task relationships 601–620 to be customized to display only desired ones of the tasks 401–417 (FIG. 4).

The disabling of a task in a task relationship using the fine cut tool 26 is best understood with reference to the table 800 of FIG. 8. When a task 401–417 is disabled in the task relationship 601–620 using the fine cut tool 26, the active flag information 812 will indicate that the display setting for the selected task has been set to DISABLE within a particular one of the task relationships 601–620. However, the disabling of the task 401–417 using the fine cut tool 26 will only affect the selected task 401–417 in the corresponding task relationship 601–620 as identified in the task view information 802. If the selected task is to be disabled in another task relationship 601–620, the fine cut tool 26 must be used again to disable the task 401–417 in the other task relationship 601–620.

Figure 18:
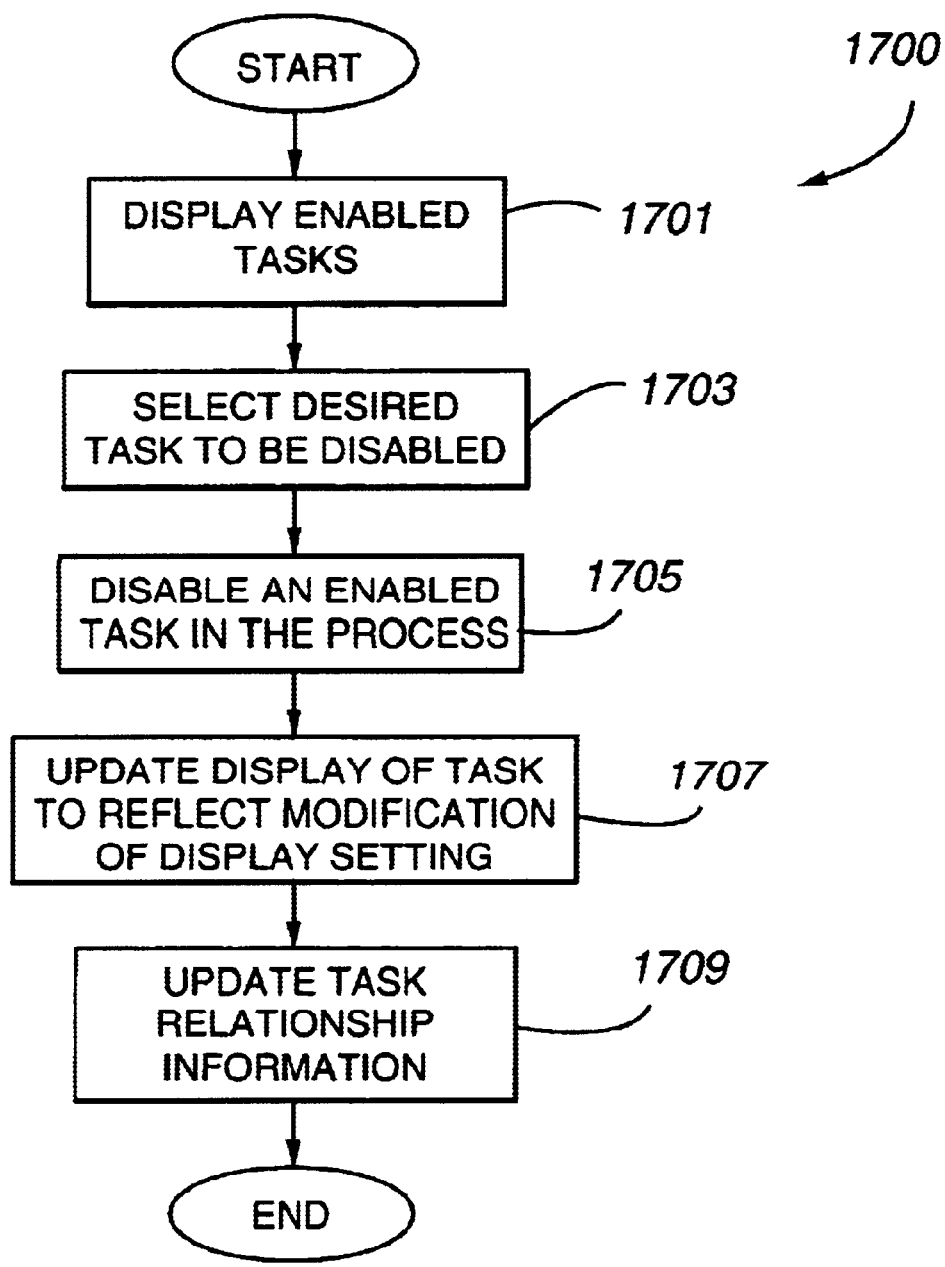
FIG. 18 is a flow chart describing the operation of a fine cut application.

A flow chart 1700 is shown in FIG. 18 to describe the operation of the fine cut tool 26. The tasks 401–417, whose display settings are set to ENABLE, are displayed by the GUI 18 (FIG. 1) at box 1701 to present the available tasks 401–417 to the user. A task within a task relationship is selected at box 1703 for disablement. The task's display setting is set to DISABLE at box 1705, and the task relationship information 23 (FIG. 1) is then updated at box 1707 to reflect the modified display setting for the task. The display of the task within the task relationship is updated to reflect the modified display setting at box 1709 before the operation terminates.

Task Views

As described above in connection with FIGS. 6, 8 and 9, the task relationship information 25 defines a group of parent/child task relationships 601–620. The task relationships 601–620 enable the available processes to be organized and presented in a logical manner. As shown in FIG. 10, the processes "STOCK PROCUREMENT," "ELECTRONIC PROCUREMENT" and "PROCESS PAYMENTS" are associated with the TV1 task view. These processes of the TV1 task view represent the processes required for procurement purposes, and represent only a subset of all of the available processes.

In a large enterprise, the task views identified in the task view information 802 (FIG. 8) could include arrangements and selections of the processes for various enterprise operations, including but not limited to day to day operations, operations to enable the enterprise's applications to "go live," operations to change the applications once they are live, and training operations. By arranging the processes within the available task views, the processes required to complete each one of the operations are within the same task view, thereby aiding in the completion of the required processes.

Within each operation there may be particular processes that a user might perform when acting in a particular role. A role view can be set up as another task view, where the role view includes a subset of the corresponding task view's processes. The use of role views permits further compartmentalization of the processes associated with an enterprise's operations.

Linking

As described above in connection with the tables 700 and 800 (FIGS. 7 and 8) describing the task property information 21 (FIG. 1) and the task relationship information 25, the tables 700 and 800 include link information 716 and 812. The link information 716 and 812 identify one or more tasks and associated task views, and facilitate the completion of all processes related to the selected task without having to navigate through all of the available processes.

Figure 19:
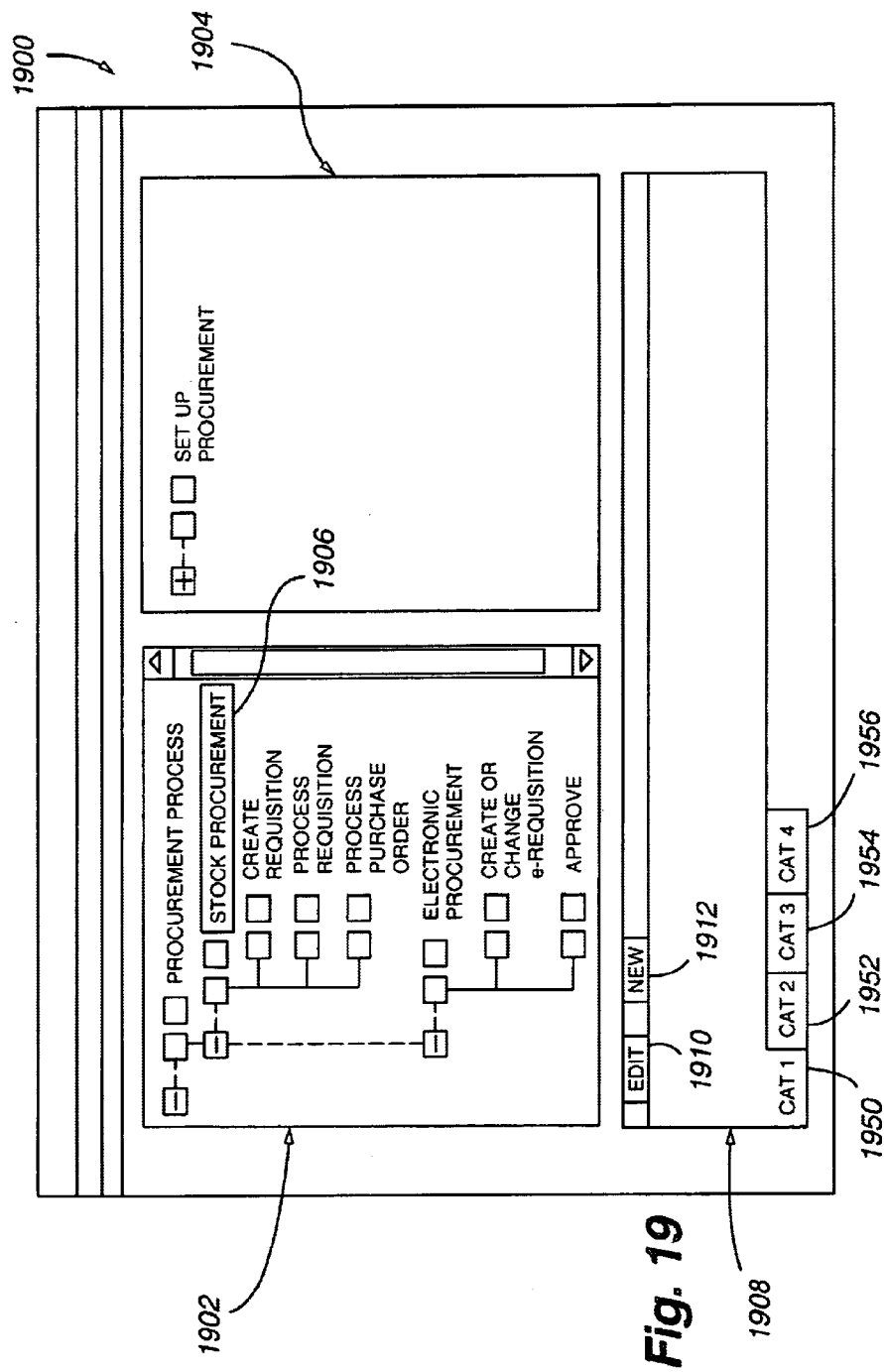
FIG. 19 is a console interface displaying a process window, a link window and a document control window.
Figure 20:
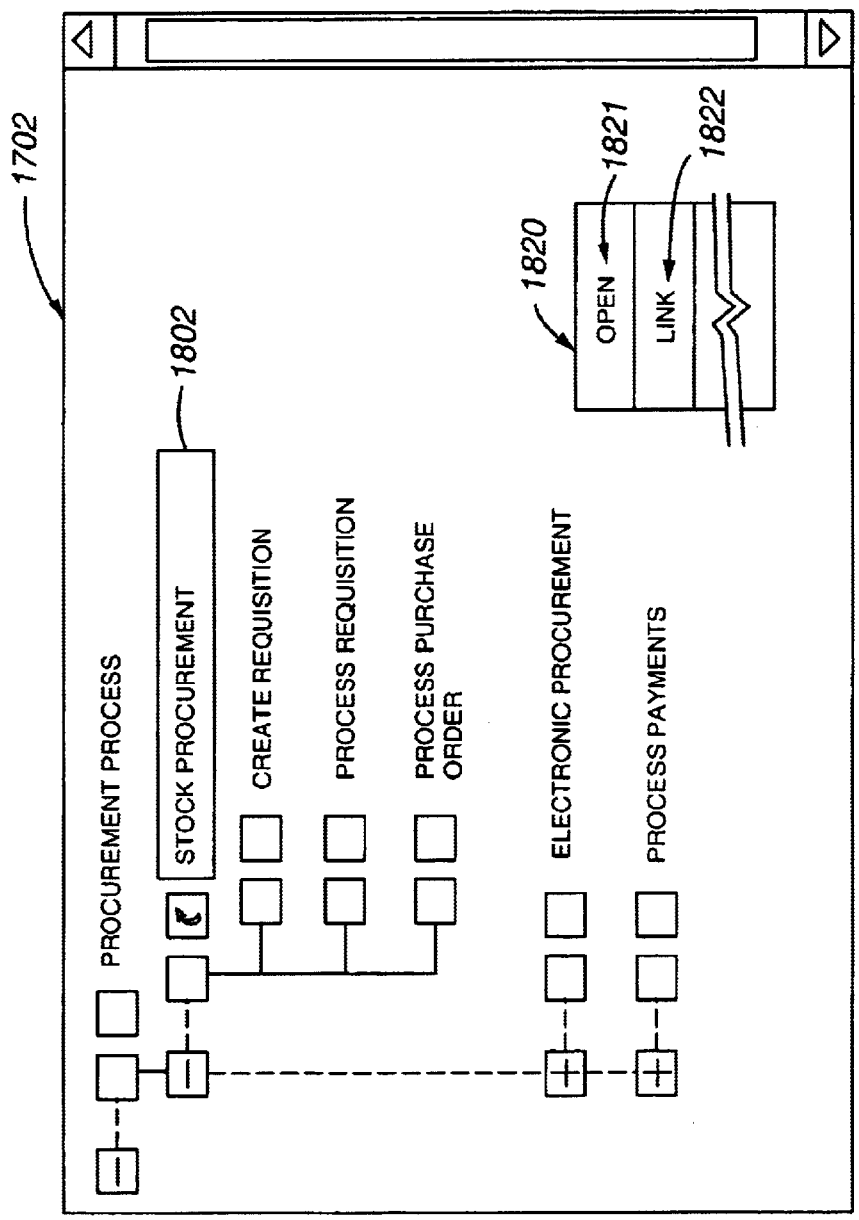
FIG. 20 is an enlarged view of the process window of FIG. 19.

Considering now the linking of processes in greater detail with reference to FIGS. 19 and 20, the process linking function of the present invention enables a visual perception of the relationship between the selected process and its linked processes through a console interface 1900 (FIG. 19) having a task view window 1902, a linking window 1904, and a documentation window 1908. The task view window 1902 is substantially similar to the task view window 900 (FIG. 10). Before a task is selected from the console 1900, only the task view window 1902 is displayed. Upon the selecting and linking of a task, such as the "STOCK PROCUREMENT" task, as indicated by the focus control 1906, the task view window 1902 reduces in size to accommodate the display of the linking window 1904 and the documentation window 1908 concurrently with the task view window 1902.

The linking window 1904 includes a "SET UP PROCUREMENT" process, where the "SET UP PROCUREMENT" process is identified in the table 700 (FIG. 7) as being linked to the TN task in the TV1 task view. By displaying the linked "SET UP PROCUREMENT" process in the linking window 1904, the navigation through the available processes to locate the linked "SET UP PROCUREMENT" process is made much simpler. Once displayed in the linking window 1904, the "SET UP PROCUREMENT" process can be selected and completed by executing its steps.

Alternatively, the linked "SET UP PROCUREMENT" process can be completed by use of a pop-up menu 1820 as shown in FIG. 20. As illustrated in FIG. 20, the selection of the "STOCK PROCUREMENT" task in the task view window 1902, as indicated by the focus control 1802, launches the pop-up menu 1820. In the preferred embodiment, the pop-up menu 1820 is launched using a right mouse click of the pointing device 312 (FIG. 3).

The pop-up menu 1820 includes a group of controls, including the open control 1821 and the link control 1822. Selecting the open control 1821 will enable the selected task to be executed. Where the selected task is a software event, the application associated with the task will be launched. Selecting the link control 1822 will enable the linked "SET UP PROCUREMENT" process to appear in the link window 1904 (FIG. 19). Additional link controls (not shown) will appear in the pop-up menu 1820 when more than one process is linked to the selected process in the task view window 1902.

Task Based Documentation

Considering now the documentation window 1908 (FIG. 19) in greater detail, the window 1908 includes a group of tabs including tabs 1950, 1952, 1954 and 1956 associated with the selected "STOCK PROCUREMENT" task. Each one of the tabs 1950, 1952, 1954 and 1956 is associated with a category of documentation for a task. For example, the documentation categories might include summary documentation, detail documentation, "before you begin" documentation, notes documentation, deliverables documentation, custom documentation. Other types of documentation are also contemplated.

The document window 1908 facilitates the displaying of the documentation information 35 (FIG. 1) to provide context sensitive information regarding the selected task. The documentation information 35 associates the tasks 401–417 (FIG. 4) with documentation pertaining to the tasks 401–417, wherein documentation associated with a selected task, if any, is displayed in the window 1908. The documentation information 35 can be maintained in a variety of formats, including standard word processing formats and the hyper-text mark-up language ("HTML") format. In the preferred embodiment of the present invention, the documentation window 1908 is generated by a web browser such as the INTERNET EXPLORER 5.0 browser marketed by the Microsoft Corporation of Redmond, Wash.

Figure 21:
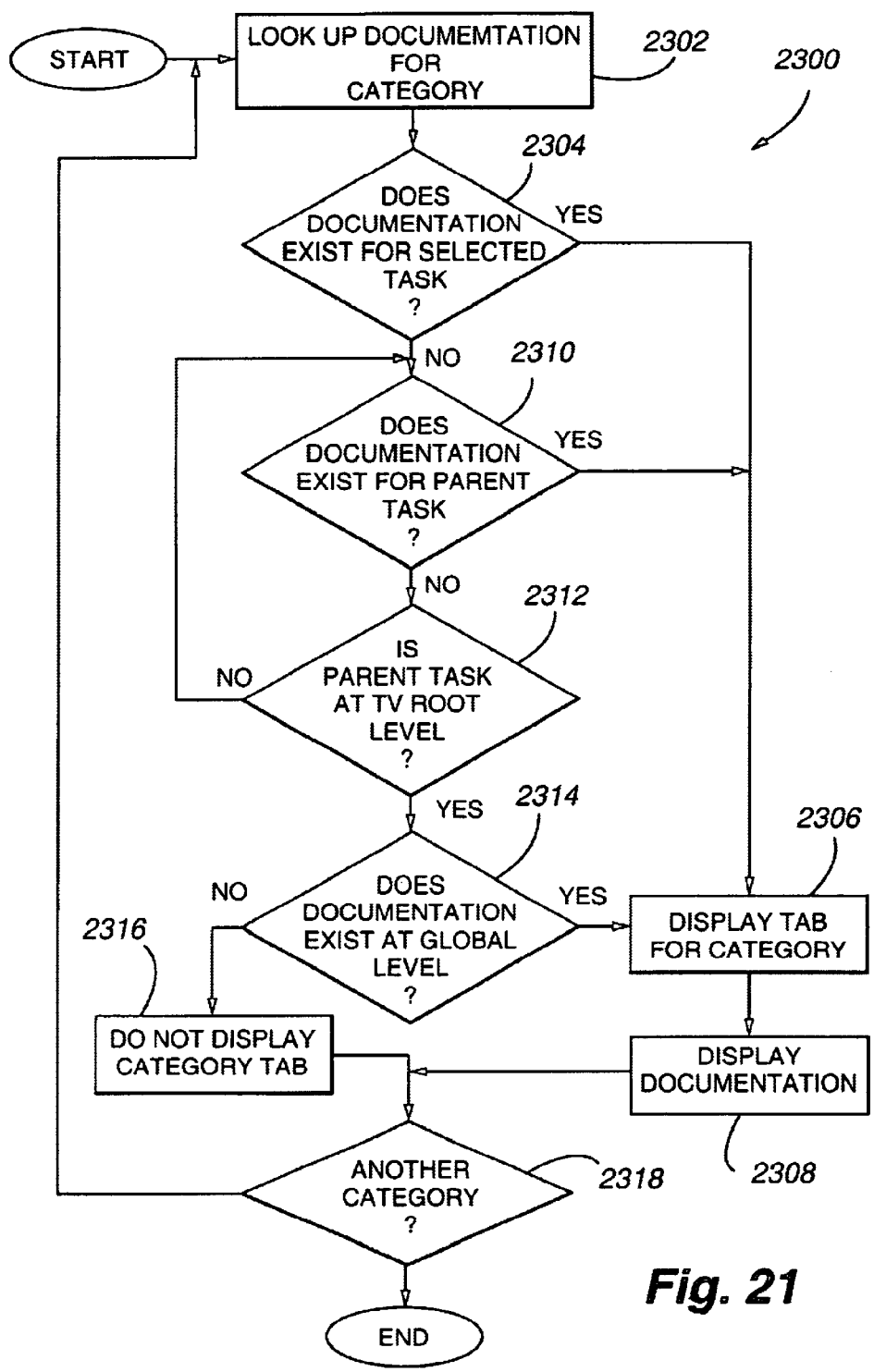
FIG. 21 is flow chart describing the selection of document information to be displayed in the document window of FIG. 19.

A flow chart 2300 describing the documentation display operation is shown in FIG. 21. Upon the selection of a task, a look up is performed at box 2302 for documentation pertaining to the task under a first category. A determination is made at decision box 2304 as to whether such documentation exists for that category. If it is determined that the documentation does exist, a tab for the category is displayed at box 2306 and the documentation is displayed at box 2308.

If it is determined at decision box 2304 that no documentation exists for the task, a determination is then made at decision box 2310 regarding the existence of documentation under the same category for the parent of the selected task. The tab for the category is displayed at box 2306 when it is determined that the documentation exists for the parent, and the documentation for the parent is displayed at box 2308.

Where it is determined at decision box 2310 that no documentation exists for the parent task, a determination is made at decision box 2312 as to whether the parent task is at the root level of the task view. If the parent task is not at the task view root level, the operation returns to the decision box 2310 to determine if the parent of the parent task has documentation. A determination that the parent task, or parent of the parent task, etc., is at the task view root level leads to a determination at decision box 2314 regarding the existence of documentation for the category at the global level.

Where it is determined that the documentation does exist at the global level, the category tab is displayed at box 2306 and the documentation is displayed at box 2308. However, if it is determined at decision box 2314 that documentation does not exist at the global level, the tab is not displayed for the category at box 2316. A determination is then made at decision box 2318 as to whether there are other categories of documentation available. A positive determination at box 2318 returns the operation to box 2302 to find documentation for the other category. A negative determination will result in the termination of the operation.

Document Editor

Considering now the modification of the documentation information 35 in greater detail with reference to FIG. 19, the documentation window 1908 also includes an edit control 1910 and a new tab control 1912.

To edit the documentation for a particular tab, such as the tabs 1950, 1952, 1954 and 1956, focus is placed on the desired tab and the edit control 1910 is selected. A documentation editor 32 (FIG. 1) is responsive to the selection of the edit control 1910 for revising the documentation information 35 associated with the highlighted tab. The documentation editor 32 is preferably a standard HTML editing tool, such as the WORD or FRONT PAGE applications marketed by the Microsoft Corporation of Redmond, Wash.

Selecting the new control 1912 enables a new tab, and associated text information, to be identified. Upon selecting the control 1912, the documentation editor 32 is launched to enable the new text information to be created for the new tab.

Home Page

Figure 22:
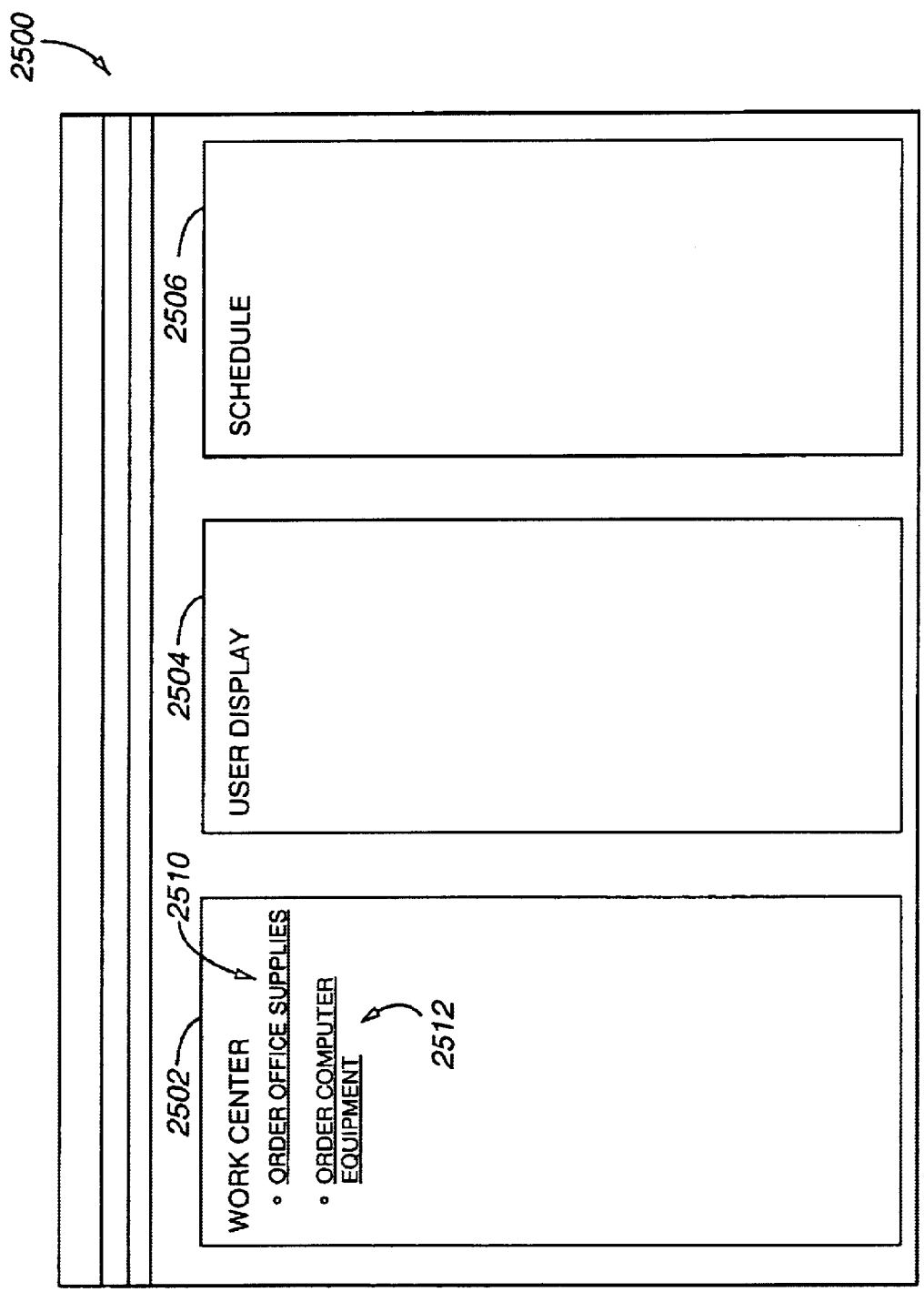
FIG. 22 is a home page interface for displaying a customized portal to facilitate the distribution of process information.

A browser 34 (FIG. 1) utilizes home page information 37 to present a home page interface 2500 (FIG. 22). The home page interface 2500 provides a portal to internal and external resources, and distributes information pertinent to the user of the enterprise applications. In this regard, the interface 2500 provides a web page as a front end to the WINDOWS based process information 14 (FIG. 1).

The home page information 37 defines the appearance of the interface 2500, as well as its content. As an example, the interface 2500 can include a group of page windows, including page windows 2502, 2504 and 2506 for presenting the home page information 37. Controls, such as controls using the ACTIVEX technology, facilitate the display of the home page information 37 on the page windows 2502, 2504 and 2506.

The page window 2502 displays hyperlinks, including hyperlinks 2510 and 2512, for initiating the P1 and P2 processes 401 and 402, respectively. The page window 2504 displays user information and the page window 2506 displays scheduling information.

The home page information 37 is preferably formatted in HTML, wherein the content of the page windows 2502, 2504 and 2506 can be modified with a standard HTML editing tool such as the WORD or FRONT PAGE applications marketed by the Microsoft Corporation of Redmond, Wash.

By using defining the interface 2500 in the HTML format, the interface 2500 can be easily customized, and the customized home page information 37 can then be made available to other users.

While particular embodiments of the present invention were disclosed, it is to be understood that various different modifications are possible and are contemplated within the true spirit and scope of the appended claims. There is no intention, therefore, of limitations to the exact abstract or disclosure presented herein.

What is claimed is:

1. A system for managing a group of processes having a plurality of process steps, comprising:

storage means for maintaining task property information indicative of a plurality of tasks to define the process steps, wherein the task information defines the process steps as software events and as non-software events;

said storage means further maintains task relationship information indicative of a relationship between said tasks to define each one of the processes, and also maintains application information defining said software events; and interface means for displaying said tasks and for enabling the selection of said tasks;

wherein a desired one of the processes can be completed by selecting said tasks associated with said desired process and executing said software events and said non-software events corresponding to said selected tasks.

2. A system according to claim 1, further including a process management means for modifying said task property information and said task relationship information for said tasks to enable each one of said tasks to be adapted for use in more than one of the processes.

3. A system according to claim 1, wherein said task relationship information identifies a parent task and a corresponding child task for the desired process, and said storage means further maintains activator information for identifying said parent task, further comprising director means responsive to the selection of said parent task for enabling the sequential execution of said software event and said non-software event corresponding to said child task to complete the desired process.

4. A system according to claim 1, wherein said storage means further maintains qualifier rule information, and further comprising a rough cut means for enabling and disabling said tasks according to said qualifier rule information to limit the display of said tasks to an available subset of said tasks.

5. A system according to claim 4, wherein said qualifier rule information includes question information corresponding to an answer assigned to each one of said tasks, and said rough cut means being responsive to said assigned answer to enable only said tasks with said assigned answer to be included in said available subset of said tasks.

6. A system according to claim 4, further including fine cut means for selectively enabling and disabling said subset of said task to enable said subset of said tasks to be further reduced.

7. A system according to claim 1, wherein said task relationship information includes task view information indicative of a task view to identify the processes associated with said task view, and said interface means being responsive to said task view information for displaying only said tasks associated with the processes of said task view.

8. A system according to claim 7, further including a task relationship editor for modifying said task relationship information corresponding to said tasks.

9. A system according to claim 7, further including role information identifying a subset of the processes associated with said task view, and said interface means being responsive to said role information for displaying only said tasks associated with said subset of the processes.

10. A system according to claim 1, wherein said task relationship information further includes link information identifying a process related to said desired task, and said interface means being responsive to said selection of said desired task for enabling the display of said related process and for enabling the launching of said desired task.

11. A system according to claim 1, wherein said interface means further displays a link window identifying said related process and for enabling the execution of said related process from said link window.

12. A system according to claim 1, wherein said storage means further maintains documentation information corresponding to said tasks, and said interface means being responsive to said selection of said tasks to display said documentation information corresponding to said tasks.

13. A system according to claim 12, wherein said documentation information includes category information identifying a category associated with said tasks, and said interface means initially determines if said desired task has documentation and subsequently determines if a higher level node has documentation for that category.

14. A system according to claim 12, further including a documentation editor for modifying said documentation information.

15. A system according to claim 1, said storage means further maintaining home page information indicative of a home page interface, and further including an HTML editing tool for customizing said home page information, wherein the customized home page information is available for access by a group of enterprise users.

16. A method for managing a group of processes having a plurality of process steps, comprising:

maintaining task property information indicative of a plurality of tasks to define the process steps, wherein the task property information defines the process steps as software events and as non-software events;

maintaining task relationship information indicative of a relationship between said tasks to define each one of the processes, and maintaining application information defining said software events;

displaying said tasks to enable the selection of said tasks; and selecting said tasks associated with said desired process and executing said software events and said non-software events corresponding to said selected tasks.

17. A method according to claim 16, further including modifying said task property information and said task relationship information to enable each one of said tasks to be adapted for use in more than one of the processes.

18. A method according to claim 16, further including identifying a parent task and a child task for the desired process, maintaining activator information to identify an activator task, and enabling the sequential execution of said software events and said non-software events corresponding to said child task to complete the desired process.

19. A method according to claim 16, further including maintaining qualifier rule information, and enabling and disabling said tasks according to said qualifier rule information to limit the display of said tasks to an available subset of said tasks.

20. A method according to claim 19, further including identifying question information corresponding to an answer assigned to each one of said tasks, and enabling only said tasks with said assigned answer to be included in said available subset of said tasks.

21. A method according to claim 19, further including selectively enabling and disabling said subset of said tasks to enable said subset of said tasks to be further reduced.

22. A method according to claim 16, further including identifying the processes associated with said task view, and displaying only said tasks associated with the processes of said task view.

23. A method according to claim 22, further including modifying said task relationship information corresponding to said tasks.

24. A method according to claim 22, further including identifying a subset of the processes associated with said task view, and displaying only said tasks associated with said subset of the processes.

25. A method according to claim 16, further including identifying a process related to said desired task, and enabling both the display of said related process and the launching of said desired task.

26. A method according to claim 16, further including identifying said related process in a link window and enabling the execution of said related process from said link window.

27. A method according to claim 16, further including maintaining documentation information corresponding to said tasks, and displaying said documentation information corresponding to said tasks when said task is selected.

28. A method according to claim 27, further including identifying a category associated with said tasks, and initially determining if said desired task has documentation within said category and subsequently determining if a higher level node has documentation for that category.

29. A method according to claim 27, further including modifying said documentation information.

30. A method according to claim 16, further including maintaining home page information indicative of a home page interface, customizing said home page information with an HTML editing tool, and making said customized home page information available for access by a group of enterprise users.

* * * * *